US011855967B2

(12) United States Patent
Li et al.

(10) Patent No.: US 11,855,967 B2
(45) Date of Patent: Dec. 26, 2023

(54) METHOD FOR IDENTIFYING APPLICATION INFORMATION IN NETWORK TRAFFIC, AND APPARATUS

(71) Applicant: HUAWEI TECHNOLOGIES CO., LTD., Guangdong (CN)

(72) Inventors: Youyong Li, Beijing (CN); Ying Xiong, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 845 days.

(21) Appl. No.: 16/737,373

(22) Filed: Jan. 8, 2020

(65) Prior Publication Data
US 2020/0145380 A1 May 7, 2020

Related U.S. Application Data

(63) Continuation of application No. 15/839,329, filed on Dec. 12, 2017, which is a continuation of application (Continued)

(30) Foreign Application Priority Data

Dec. 28, 2015 (CN) .......................... 201511000809.5

(51) Int. Cl.
H04L 9/00 (2022.01)
H04L 9/40 (2022.01)
(Continued)

(52) U.S. Cl.
CPC .......... H04L 63/0245 (2013.01); H04L 41/00 (2013.01); H04L 43/028 (2013.01);
(Continued)

(58) Field of Classification Search
None
See application file for complete search history.

(56) References Cited

U.S. PATENT DOCUMENTS 8,520,538 B2 8/2013 Dinan
8,612,612 B1 12/2013 Mohini et al.
(Continued)

FOREIGN PATENT DOCUMENTS

CN 101873640 10/2010
CN 102026151 4/2011
(Continued)

OTHER PUBLICATIONS

F. Gringoli, Luca Salgarelli, M. Dusi, N. Cascarano, F. Risso, and k. c. claffy. 2009. GT: picking up the truth from the ground for internet traffic. SIGCOMM Comput. Commun. Rev. 39, 5 (Oct. 2009), 12-18. https://doi.org/10.1145/1629607.1629610 (Year: 2009).*

(Continued)

Primary Examiner — Daniel B Potratz
Assistant Examiner — Syed M Ahsan
(74) Attorney, Agent, or Firm — Fish & Richardson P.C.

(57) ABSTRACT

A first correspondence table in a terminal device stores a first correspondence between an identifier of a process running on the terminal device and an identifier of a data stream created by the process. A second correspondence table stores a second correspondence between an identifier of an application and an identifier of a process created by the application. The terminal device receives an identifier of a first data stream from a network security device, finds, in the first correspondence table, a first record where the identifier of the first data stream is stored to obtain an identifier of a process in the first record, finds, in the second correspondence table, a second record where the identifier of the process in the first record is stored to obtain an identifier of (Continued)

an application from the second record, and sends the identifier of the application to the network security device.

20 Claims, 17 Drawing Sheets

Related U.S. Application Data

No. PCT/CN2016/099891, filed on Sep. 23, 2016, now Pat. No. 11,582,188.

(51) Int. Cl.
| | | |
|---|---|---|
| *H04W 28/10* | (2009.01) | |
| *H04W 24/00* | (2009.01) | |
| *H04L 43/028* | (2022.01) | |
| *H04L 41/00* | (2022.01) | |
| *H04L 43/062* | (2022.01) | |
| *H04L 47/2475* | (2022.01) | |
| *H04L 43/026* | (2022.01) | |
| *H04L 67/51* | (2022.01) | |

(52) U.S. Cl.
CPC ........ *H04L 43/062* (2013.01); *H04L 47/2475* (2013.01); *H04L 63/1425* (2013.01); *H04W 24/00* (2013.01); *H04W 28/10* (2013.01); *H04L 43/026* (2013.01); *H04L 63/10* (2013.01); *H04L 63/20* (2013.01); *H04L 67/51* (2022.05)

(56) References Cited

U.S. PATENT DOCUMENTS

| | | | | |
|---|---|---|---|---|
| 9,258,313 | B1* | 2/2016 | Knappe | H04L 63/0236 |
| 10,033,747 | B1* | 7/2018 | Paithane | G06F 21/566 |
| 2009/0241170 | A1* | 9/2009 | Kumar | H04L 47/2458 |
| | | | | 370/235 |
| 2011/0208696 | A1 | 8/2011 | Pang | |
| 2012/0215911 | A1* | 8/2012 | Raleigh | H04M 15/66 |
| | | | | 709/224 |
| 2012/0221590 | A1* | 8/2012 | Liu | H04L 9/40 |
| | | | | 707/E17.014 |
| 2013/0238782 | A1 | 9/2013 | Zhao et al. | |
| 2014/0233421 | A1* | 8/2014 | Matthews | H04L 49/35 |
| | | | | 370/253 |
| 2014/0289856 | A1* | 9/2014 | Jiang | G06F 21/552 |
| | | | | 726/23 |
| 2014/0310402 | A1 | 10/2014 | Giaretta et al. | |
| 2015/0222529 | A1 | 8/2015 | Nakao | |
| 2017/0048155 | A1 | 2/2017 | Pan | |
| 2018/0103011 | A1 | 4/2018 | Li et al. | |

FOREIGN PATENT DOCUMENTS

| | | |
|---|---|---|
| CN | 102195816 | 9/2011 |
| CN | 102201982 | 9/2011 |
| CN | 103095604 | 5/2013 |
| CN | 103746768 | 4/2014 |
| CN | 105812188 | 7/2016 |
| JP | 2015142324 | 8/2015 |
| JP | 2015164295 | 9/2015 |
| WO | 2014168835 | 10/2014 |
| WO | 2015165296 | 11/2015 |

OTHER PUBLICATIONS

Gringoli, F., Salgarelli, L., Dusi, M., Cascarano, N., Risso, F., & Claffy, K. C. (2009). Gt: picking up the truth from the ground for internet traffic. ACM SIGCOMM Computer Communication Review, 39(5), 12-18. (Year: 2009).*

Extended European Search Report issued in European Application No. 16880893.3 dated Apr. 26, 2018, 10 pages.

International Search Report in International Application No. PCT/CN2016/099891, dated Dec. 28, 2016, 7 pages.

Office Action issued in Japanese Application No. 2018-502243 dated Sep. 9, 2019, 5 pages (with English translation).

* cited by examiner

METHOD FOR IDENTIFYING APPLICATION INFORMATION IN NETWORK TRAFFIC, AND APPARATUS

CROSS-REFERENCE TO RELATED APPLICATIONS

This application is a continuation of U.S. patent application Ser. No. 15/839,329, filed on Dec. 12, 2017, which is a continuation of International Application No. PCT/CN2016/099891, filed on Sep. 23, 2016, which claims priority to Chinese Patent Application No. 201511000809.5, filed on Dec. 28, 2015. All of the aforementioned patent applications are hereby incorporated by reference in their entireties.

TECHNICAL FIELD

This application relates to the field of computer and network communications technologies, and in particular, to a method for identifying application information in network traffic and an apparatus for identifying application information in network traffic.

BACKGROUND

With rapid development of Internet technologies, various applications, including services and games, implemented based on Internet technologies become increasingly abundant. To meet various demands of an enterprise or a network regulatory authority, for example, to implement management and control on online behavior of a user, or rank current popular applications by collecting statistics on traffic, traffic identification becomes a basic function of a network security device. The network security device includes a packet forwarding device having a traffic analysis and management function, such as a security gateway, a firewall, and a deep packet inspection (DPI) device.

Traffic identification technologies are classified into a protocol identification technology and an application identification technology. As the name implies, the protocol identification technology means that a network security device determines a protocol type to which each data stream in traffic flowing through the device belongs, and further, may determine proportions of data streams of different protocol types in total traffic.

An "application" in this application refers to application software that provides a specific function and that has a network access and packet processing capability. After such application software runs on a terminal device, a network interface on the terminal device can be enabled, a connection to another terminal device in a network is established by using the enabled interface, and a series of packets are transmitted by using the established connection. Then, specific functions, for example, a web browser Internet Explorer (IE), instant messaging software Tencent QQ, and a File Transfer Protocol (FTP) client FileZilla, are provided to a user by processing the received packets.

An application runs on a protocol; in other words, multiple different applications may run on a same type of protocol. For example, a peer to peer (P2P) client and a web browser are both implemented based on the Hypertext Transfer Protocol (HTTP) protocol. Therefore, if traffic identification, and management and control are performed based only on the HTTP protocol, whether a data stream is sent by the P2P client or sent by the web browser cannot be identified. If a type of an application sending a data stream of the HTTP protocol can be identified by using the application identification technology, whether a user is performing a work-related web access activity or playing a non-work-related online game can be known, so as to block traffic caused by the online game. Therefore, compared with a conventional protocol identification technology, an application identification technology may be used to obtain a more correct management and control effect.

An existing application identification technology mainly includes a feature-based identification technology, a heuristic identification technology, and an association identification technology.

The feature-based identification technology refers to identifying, by using a format design feature of a packet specific to an application, such as a distinctive keyword, or field content at a fixed location, an application sending the packet. For example, after the network security device receives a packet, whether the packet carries a keyword "PPLiveVA" is queried, and if the packet carries the keyword "PPLiveVA", it indicates that an application sending the packet is a web television PPTV.

The heuristic identification technology refers to obtaining, by analyzing phenomena, such as a length of a packet sent by an application, an appearance regularity of a character in content of the packet, an interaction regularity of two communication sides, and a packet sending interval, a statistical rule that can be used to distinguish the application from another application, and then distinguishing, by using the rule, the application sending the packet. The heuristic identification technology has a particular identification effect on an encrypted packet, or a packet that is sent by using a private undisclosed protocol. However, because the rule is obtained by statistical analysis, problems of a relatively high missed report rate and false reporting rate are caused.

The association identification technology refers to matching an IP address, a port number, and a protocol identifier that are of a packet with an association identification rule that includes correspondences between an application, and an IP address, a port number, and a protocol identifier, to identify an application sending the packet.

Features and rules on which the existing application identification technology depends are all obtained by manually analyzing a large quantity of collected packets. A network security device vendor or a third-party agency cooperating with the network security device vendor uploads an upgrade rule library including a feature and a rule to an upgrade website of the software vendor, and a network security device obtains the upgrade rule library from the upgrade website, so as to ensure an identification capability of the network security device. However, due to factors such as a non-timely upgrade of a rule library, and low accuracy of the heuristic identification technology, by means of the existing application identification technology, a considerable proportion of network traffic still cannot be identified, or an incorrect identification result is obtained for a considerable proportion of network traffic.

SUMMARY

Embodiments of this application provide a method for identifying application information in network traffic, so as to improve an identification effect of an application identification technology.

The embodiments of this application provide the following technical solutions:

According to a first aspect, a method for identifying application information in network traffic is provided, and the method is executed by a terminal device. A first correspondence table in the terminal device stores, in a record form, a correspondence between an identifier of a process running on the terminal device and an identifier of a data stream created by the process. A second correspondence table in the terminal device stores, in a record form, a correspondence between an identifier of an application and an identifier of a process created by the application. The identifier of the data stream is a 5-tuple including a source address, a source port, a destination address, a destination port, and a protocol identifier.

The method includes:
receiving an identifier, sent by a network security device, of a first data stream;
finding, by the terminal device in the first correspondence table, a first record in which the identifier of the first data stream is stored, to obtain an identifier of a process in the first record;
finding, by the terminal device in the second correspondence table, a second record in which the identifier of the process in the first record is stored, to obtain an identifier of an application from the second record; and
sending the identifier of the application to the network security device.

According to the method for identifying application information in network traffic provided in this embodiment of this application, the terminal device finds, according to the identifier of the data stream sent by the network security device, a locally stored correspondence table, and then feeds back the identifier of the application to the network security device, thereby assisting the network security device in determining an application identification result of the data stream. In comparison with the prior art, in the foregoing method, more applications can be identified by means of interaction between the network security device and the terminal device, so that a proportion of unidentified traffic in total traffic is reduced, and an effect of identifying network traffic is improved.

The terminal device may obtain and update the first correspondence table in the following manners to ensure realtimeness of the first correspondence table and reduce occupied storage space.

Optionally, the terminal device obtains the first correspondence table by using the following steps:
obtaining, by the terminal device by using an interface provided by an operating system, an identifier of at least one process running on the terminal device; and
for each obtained identifier of a process, obtaining, by the terminal device, an identifier of a data stream created by the process, generating a record including the identifier of the process and the identifier of the data stream, and storing the record in the first correspondence table.

Optionally, the terminal device obtains the first correspondence table by using the following steps:
obtaining, by the terminal device by using a hook function, an event that the operating system creates a process;
obtaining an identifier of the newly created process from the event of creating a process; and
obtaining an identifier of a data stream created by the newly created process, generating a record including the identifier of the newly created process and the identifier of the data stream created by the newly created process, and storing the record in the first correspondence table; and the terminal device obtains the first correspondence table further includes:
obtaining, by the terminal device by using the hook function, an event that the operating system exits a process; and
obtaining an identifier of the exited process from the event of exiting a process, and deleting, from the first correspondence table, a record including the identifier of the exited process.

Optionally, a record in the first correspondence table further includes a last activity time of a data stream and the method further includes:
determining, by the terminal device, an expired record in the first correspondence table, where the expired record is a record in which a time interval between a last activity time that is of a data stream and that is included in the expired record and a current time exceeds a predetermined time interval; and
deleting the expired record.

Optionally, after the terminal device obtains the first correspondence table, the method further includes:
obtaining, by the terminal device by using the hook function, a packet transmitted by the terminal device;
obtaining, from the obtained packet, an identifier of a data stream to which the packet belongs; and
updating a last activity time of a data stream in a record that is in the first correspondence table and that includes the identifier of the data stream to which the packet belongs to the current time.

Optionally, after the terminal device obtains the first correspondence table, the method further includes:
obtaining, by the terminal device by using the hook function, a packet transmitted by the terminal device;
obtaining, from the obtained packet, a packet status identifier and an identifier of a data stream to which the packet belongs; and
if the packet status identifier is FIN, deleting, from the first correspondence table, a record including the identifier of the data stream to which the packet belongs.

To obtain a complete data stream to facilitate subsequent analysis such as rule extraction, optionally, after the obtaining an identifier of a process in the first record, the method further includes:
setting a packet collection flag for the identifier of the process, where the packet collection flag is used to instruct the terminal device to obtain and store, after capturing by using the interface of the operating system a packet transmitted by the process, a complete data stream subsequently transmitted by the process.

According to a second aspect, a terminal device is provided. The terminal device includes a memory, a processor, and a network interface, and the memory, the processor, and the network interface communicate with each other by using a bus.

The memory stores program code, a first correspondence table, and a second correspondence table, where the first correspondence table stores, in a record form, a correspondence between an identifier of a process running on the terminal device and an identifier of a data stream created by the process, the second correspondence table stores, in a record form, a correspondence between an identifier of an application and an identifier of a process created by the application, and the identifier of the data stream is a 5-tuple including a source address, a source port, a destination address, a destination port, and a protocol identifier.

The network interface is configured to receive an identifier, sent by a network security device, of a first data stream.

The processor reads the program code stored in the memory, to perform the following steps:

finding, in the first correspondence table, a first record in which the identifier of the first data stream is stored, to obtain an identifier of a process in the first record; and finding, in the second correspondence table, a second record in which the identifier of the process in the first record is stored, to obtain an identifier of an application from the second record.

The network interface is further configured to send the identifier of the application obtained by the processor to the network security device.

Optionally, the processor is further configured to obtain the first correspondence table by using the following operations; obtaining, by using an interface provided by an operating system, an identifier of at least one process running on the terminal device; and for each obtained identifier of a process, obtaining, by the terminal device, an identifier of a data stream created by the process, generating a record including the identifier of the process and the identifier of the data stream, and storing the record in the first correspondence table.

Optionally, the processor is further configured to obtain the first correspondence table by using the following operations:

obtaining, by using a hook function, an event that the operating system creates a process; obtaining an identifier of the newly created process from the event of creating a process; and obtaining an identifier of a data stream created by the newly created process, generating a record including the identifier of the newly created process and the identifier of the data stream created by the newly created process, and storing the record in the first correspondence table; and obtaining, by using the hook function, an event that the operating system exits a process; and obtaining an identifier of the exited process from the event of exiting a process, and deleting, from the first correspondence table, a record including the identifier of the exited process.

Optionally, a record in the first correspondence table further includes a last activity time of a data stream; and the processor is further configured to: determine an expired record in the first correspondence table, where the expired record is a record in which a time interval between a last activity time that is of a data stream and that is included in the expired record and a current time exceeds a predetermined time interval; and delete the expired record.

Optionally, the processor is further configured to: after obtaining the first correspondence table, obtain, by the terminal device by using the hook function, a packet transmitted by the terminal device;

obtain, from the obtained packet, an identifier of a data stream to which the packet belongs; and update a last activity time of a data stream in a record that is in the first correspondence table and that includes the identifier of the data stream to which the packet belongs to the current time.

Optionally, the processor is further configured to: after obtaining the first correspondence table, obtain, by the terminal device by using the hook function, a packet transmitted by the terminal device;

obtain, from the obtained packet, a packet status identifier and an identifier of a data stream to which the packet belongs; and if the packet status identifier is FIN, delete, from the first correspondence table, a record including the identifier of the data stream to which the packet belongs.

According to a third aspect, a network security device is provided, including a memory, a processor, and a network interface. The memory, the processor, and the network interface communicate with each other by using a bus.

The network interface is configured to receive a first data stream.

The processor is configured to read program code stored in the memory, to perform the following steps:

if an application sending the first data stream cannot be identified, obtaining an identifier of the first data stream, where the identifier of the data stream is a 5-tuple including a source address, a source port, a destination address, a destination port, and a protocol identifier; and instructing the network interface to send the identifier of the data stream to the terminal device according to the source address or the destination address in the identifier of the first data stream, where an address of the terminal device is the source address or the destination address in the identifier of the first data stream.

The network interface is further configured to receive an identifier of an application sent by the terminal device; and determine that the received identifier of the application is an identifier of an application sending the first data stream.

The network security device provided in this embodiment of this application can identify more applications by interacting with the terminal device, so that a proportion of unidentified traffic in total traffic is reduced, and an effect of identifying network traffic is improved.

According to a fourth aspect, a system for identifying application information in network traffic is provided, including a network security device and a terminal device.

The network security device is configured to: receive a first data stream, and obtain an identifier of the first data stream, where the identifier of the first data stream is a 5-tuple including a source address, a source port, a destination address, a destination port, and a protocol identifier; send the identifier of the first data stream to the terminal device according to the source address or the destination address in the identifier of the first data stream, where an address of the terminal device is the source address or the destination address in the identifier of the first data stream; receive an identifier of an application sent by the terminal device; and determine that the received identifier of the application is an identifier of an application sending the first data stream.

The terminal device stores a first correspondence table and a second correspondence table, where the first correspondence table stores, in a record form, a correspondence between an identifier of a process running on the terminal device and an identifier of a data stream created by the process, the second correspondence table stores, in a record form, a second correspondence between an identifier of an application and an identifier of a process created by the application, and the identifier of the data stream is a 5-tuple including a source address, a source port, a destination address, a destination port, and a protocol identifier.

The terminal device is configured to: receive the identifier, sent by the network security device, of the first data stream; find, in the first correspondence table, a first record in which the identifier of the first data stream is stored, to obtain an identifier of a process in the first record; find, in the second correspondence table, a second record in which the identifier of the process in the first record is stored, to obtain an identifier of an application from the second record; and send the identifier of the application to the network security device.

In the system for identifying application information in network traffic provided in this embodiment of this application, the network security device determines an application identification result of a data stream according to a feedback from the terminal device. In comparison with the prior art, in the foregoing system, more applications can be identified by means of interaction between the network security device and the terminal device, so that a proportion of unidentified traffic in total traffic is reduced, and an effect of identifying network traffic is improved.

To improve an identification success rate of a subsequent data stream in the network security device, the network security device may further generate a new association identification rule according to the feedback from the terminal.

Optionally, the network security device is further configured to: generate a first association identification rule and a second association identification rule, where the first association identification rule includes the identifier of the application, and a 3-tuple including the destination address, the destination port, and the protocol identifier of the first data stream; and the second association identification rule includes the identifier of the application, and a 3-tuple including the source address, the source port, and the protocol identifier of the first data stream;

receive a second data stream, and obtain at least one of a destination 3-tuple or a source 3-tuple of the second data stream, where the destination 3-tuple of the second data stream is a 3-tuple including a destination address, a destination port, and a protocol identifier of the second data stream, and the source 3-tuple of the second data stream is a 3-tuple including a source address, a source port, and the protocol identifier of the second data stream; and if the obtained 3-tuple is consistent with a 3-tuple included in either of the first association identification rule and the second association identification rule, determine that an identifier of an application sending the second data stream is the identifier of the application included in either of the association identification rules.

According to a fifth aspect, a method for identifying application information in network traffic is provided, including:

receiving a first identification record from a network security device, where the first identification record includes an identifier of a first data stream and an identifier of an application, and the identifier of the first data stream is a 5-tuple including a source address, a source port, a destination address, a destination port, and a protocol identifier;

receiving a second identification record and a correspondence table from a terminal device, where the second identification record includes an identifier of a second data stream and an identifier of a process, and each record in the correspondence table stores an identifier of an application and an identifier of a process created by the application, that is, a correspondence between the identifier of the application and the identifier of the process is stored by using the record in the correspondence table;

if the identifier of the first data stream included in the first identification record is the same as the identifier of the second data stream included in the second identification record, querying whether a first association record exists in the correspondence table, where the first association record stores the identifier of the application included in the first identification record and the identifier of the process included in the second identification record; and if the first association record does not exist, determining that the first identification record is an incorrect identification record.

According to the method for identifying application information in network traffic provided in this embodiment of this application, a data processing device can identify, by comparing an identification record of the terminal device with that of the network security device, an incorrect identification record that is of the network security device and that is difficult to find by using the prior art. Therefore, an effect of identifying network traffic is improved.

Optionally, if the first association record does not exist, the method further includes:

sending, to the terminal device, the identifier of the process included in the second identification record, so that the terminal device sets a packet collection flag for the identifier of the process, where the packet collection flag is used to instruct the terminal device to obtain and store, after capturing by using an interface of an operating system a packet transmitted by the process, a complete data stream subsequently transmitted by the process.

After an incorrect identification record is found, to avoid a same incorrect identification record subsequently caused by an association identification rule, the data processing device may further instruct the network security device to delete an association identification rule that causes incorrect identification.

Optionally, the first identification record further includes an identifier of an identification manner, where the identification manner includes association identification manner, feature identification manner, and heuristic identification manner.

If the identifier of the identification manner in the first identification record is an identifier of an association identification manner, when the first association record does not exist, the method further includes:

sending a notification message to the network security device, where the notification message is used to instruct the network security device to delete a first association identification rule or a second association identification rule; the first association identification rule includes a 3-tuple including the destination address, the destination port, and the protocol identifier of the first data stream; and the second association identification rule includes a 3-tuple including the source address, the source port, and the protocol identifier of the first data stream.

After an incorrect identification record is found, to improve a success rate of subsequent identification, the data processing device may further instruct the network security device to generate a correct association identification rule.

Optionally, if the first association record does not exist, the method further includes:

querying whether a second association record exists in the correspondence table, where the second association record stores an identifier of a process included in the second identification record, and an identifier of a corresponding application;

if the second association record exists, generating a third association identification rule and a fourth association identification rule, where the third association identification rule includes the identifier of the application in the second association record, and a 3-tuple including the destination address, the destination port, and the protocol identifier of the first data stream, and the fourth association identification rule includes the identifier of the application in the second association record, and a 3-tuple including the source address, the source port, and the protocol identifier of the first data stream; and sending the third association identification rule and the fourth association identification rule to the network security device.

Optionally, the method further includes:

receiving a third identification record from the network security device, where the third identification record includes an identifier of a third data stream and an unidentified flag, and the unidentified flag is used to indicate that the network security device has not identified an application sending the third data stream;

receiving a fourth identification record from the terminal device, where the fourth identification record includes an identifier of a fourth data stream and an identifier of a process;

if the identifier of the third data stream included in the third identification record is the same as the identifier of the fourth data stream included in the fourth identification record, querying whether a second association record exists in the correspondence table, where the third association record stores the identifier of the process included in the fourth identification record; and if the third association record exists, generating a fifth association identification rule and a sixth association identification rule, where the fifth association identification rule includes an identifier of an application included in the third association record, and a 3-tuple including a destination address, a destination port, and a protocol identifier of the third data stream; and the sixth association identification rule includes the identifier of the application included in the third association record, and a 3-tuple including a source address, a source port, and the protocol identifier of the third data stream; and sending the fifth association identification rule and the sixth association identification rule to the network security device.

Optionally, the method further includes:

receiving a third identification record from the network security device, where the third identification record includes an identifier of a third data stream and an unidentified flag, and the unidentified flag is used to indicate that the network security device has not identified an application sending the third data stream:

receiving a fourth identification record from the terminal device, where the fourth identification record includes an identifier of a fourth data stream and an identifier of a process;

if the identifier of the third data stream included in the third identification record is the same as the identifier of the fourth data stream included in the fourth identification record, querying whether a third association record exists in the correspondence table, where the third association record stores the identifier of the process included in the fourth identification record; and if the third association record exists, sending an identifier of an application included in the third association record and the identifier of the third data stream to the network security device.

According to a sixth aspect, a method for identifying application information in network traffic is provided, including:

receiving a first identification record from a network security device, where the first identification record includes an identifier of a first data stream, an identifier of an application, and an identifier of an identification manner, the identifier of the data stream is a 5-tuple including a source address, a source port, a destination address, a destination port, and a protocol identifier, and the identification manner includes association identification, feature identification, and heuristic identification;

receiving a second identification record and a correspondence table from a terminal device, where the second identification record includes an identifier of a second data stream and an identifier of a process, and each record in the correspondence table stores a correspondence between an identifier of an application and an identifier of a process created by the application;

if the identifier of the first data stream included in the first identification record is the same as the identifier of the second data stream included in the second identification record, querying whether a first association record exists in the correspondence table, where the first association record stores the identifier of the application included in the first identification record and the identifier of the process included in the second identification record; and if the identifier of the identification manner in the first identification record is an identifier of an association identification manner, when the first association record does not exist, sending a notification message to the network security device, where the notification message is used to instruct the network security device to delete a first association identification rule or a second association identification rule, the first association identification rule includes a 3-tuple including a destination address, a destination port, and a protocol identifier of the first data stream, and the second association identification rule includes a 3-tuple including a source address, a source port, and the protocol identifier of the first data stream.

According to the method for identifying application information in network traffic provided in this embodiment of this application, after the data processing device finds an incorrect identification record, to avoid a same incorrect identification record subsequently caused by an association identification rule, the data processing device may further instruct the network security device to delete an association identification rule that causes incorrect identification.

According to a seventh aspect, a data processing device is provided. The data processing device includes a memory, a processor, and a network interface, and the memory, the processor, and the network interface communicate with each other by using a bus.

The memory stores program code.

The network interface is configured to: receive a first identification record from a network security device, where the first identification record includes an identifier of a first data stream and an identifier of an application, and the identifier of the first data stream is a 5-tuple including a source address, a source port, a destination address, a destination port, and a protocol identifier; and receive a second identification record and a correspondence table from a terminal device, where the second identification record includes an identifier of a second data stream and an identifier of a process, and each record in the correspondence table stores an identifier of an application and an identifier of a process created by the application.

The processor reads the program code stored in the memory, to perform the following steps:

if the identifier of the first data stream included in the first identification record is the same as the identifier of the second data stream included in the second identification record, querying whether a first association record exists in the correspondence table, where the first association record stores the identifier of the application included in the first identification record and an identifier of a process included in the second identification record; and if the first association record does not exist, determining that the first identification record is an incorrect identification record.

Optionally, the first identification record further includes an identifier of an identification manner, where the identification manner includes association identification manner, feature identification manner, and heuristic identification manner.

The network interface is further configured to: if the identifier of the identification manner in the first identification record is an identifier of an association identification manner, when the first association record does not exist, send a notification message to the network security device, where the notification message is used to instruct the network security device to delete a first association identification rule or a second association identification rule, the first association identification rule includes a 3-tuple including the destination address, the destination port, and the protocol identifier of the first data stream, and the second association identification rule includes a 3-tuple including the source address, the source port, and the protocol identifier of the first data stream.

Optionally, the network interface is further configured to: receive a third identification record from the network security device, where the third identification record includes an identifier of a third data stream and an unidentified flag, and the unidentified flag is used to indicate that the network security device has not identified an application sending the third data stream; and receive a fourth identification record from the terminal device, where the fourth identification record includes an identifier of a fourth data stream and an identifier of a process.

The processor is further configured to: determine whether the identifier of the third data stream included in the third identification record is the same as the identifier of the fourth data stream included in the fourth identification record; and if the identifier of the third data stream included in the third identification record is the same as the identifier of the fourth data stream included in the fourth identification record, query whether a third association record exists in the correspondence table, where the third association record stores the identifier of the process included in the fourth identification record; and if the third association record exists, generate a fifth association identification rule and a sixth association identification rule, where the fifth association identification rule includes an identifier of an application included in the third association record, and a 3-tuple including a destination address, a destination port, and a protocol identifier of the third data stream; and the sixth association identification rule includes the identifier of the application included in the third association record, and a 3-tuple including a source address, a source port, and the protocol identifier of the third data stream.

The network interface is further configured to send the fifth association identification rule and the sixth association identification rule to the network security device.

Optionally, the network interface is further configured to: receive a third identification record from the network security device, where the third identification record includes an identifier of a third data stream and an unidentified flag, and the unidentified flag is used to indicate that the network security device has not identified an application sending the third data stream; and receive a fourth identification record from the terminal device, where the fourth identification record includes an identifier of a fourth data stream and an identifier of a process.

The processor is further configured to: determine whether the identifier of the third data stream included in the third identification record is the same as the identifier of the fourth data stream included in the fourth identification record; and if the identifier of the third data stream included in the third identification record is the same as the identifier of the fourth data stream included in the fourth identification record, query whether a third association record exists in the correspondence table, where the third association record stores the identifier of the process included in the fourth identification record.

The network interface is further configured to: if the processor determines that the third association record exists, send an identifier of an application included in the third association record and the identifier of the third data stream to the network security device.

The data processing device provided in this embodiment of this application can identify, by comparing an identification record of the terminal device with that of the network security device, an incorrect identification record that is of the network security device and that is difficult to find by using the prior art. Therefore, an effect of identifying network traffic is improved.

According to an eighth aspect, a system for identifying application information in network traffic is provided, including a data processing device, a terminal device, and a network security device.

The network security device is configured to: receive a first data stream; generate a first identification record after determining an identifier of an application sending the first data stream, where the first identification record includes an identifier of the first data stream and the identifier of the application, and the identifier of the first data stream is a 5-tuple including a source address, a source port, a destination address, a destination port, and a protocol identifier; and send the first identification record to the data processing device.

The terminal device is configured to: obtain an identifier of a process running on the terminal device and an identifier of a second data stream created by the process, to generate a second identification record, where the second identification record includes the identifier of the second data stream and the identifier of the process; obtain a correspondence table, where each record in the correspondence table stores an identifier of an application and an identifier of a process created by the application; and send the second identification record and the correspondence table to the data processing device.

The data processing device is configured to: receive the first identification record from the network security device; receive the second identification record and the correspondence table from the terminal device; if the identifier of the first data stream included in the first identification record is the same as the identifier of the second data stream included in the second identification record, query whether a first association record exists in the correspondence table, where the first association record stores the identifier of the application included in the first identification record and the identifier of the process included in the second identification record; and if the first association record does not exist, determine that the first identification record is an incorrect identification record.

In the system for identifying application information in network traffic provided in this embodiment of this application, the data processing device can identify, by comparing an identification record of the terminal device with that of the network security device, an incorrect identification record that is of the network security device and that is difficult to find by using the prior art. Therefore, an effect of identifying network traffic is improved.

BRIEF DESCRIPTION OF DRAWINGS

To describe the technical solutions in the embodiments of this application or in the prior art more clearly, the following briefly describes the accompanying drawings required for describing the embodiments or the prior art. Apparently, the accompanying drawings in the following description show some embodiments of the present invention, and a person of ordinary skill in the art may still derive other drawings from these accompanying drawings without creative efforts.

FIG. 8A-1 to FIG. 8A-3 are an interaction diagram of a method for identifying application information in network traffic according to an embodiment of this application;

FIG. 8B-1 and FIG. 8B-2 are an interaction diagram of another method for identifying application information in network traffic according to an embodiment of this application;

DESCRIPTION OF EMBODIMENTS

A "data stream" in this application refers to a series of packets that are transmitted between two terminal devices within a particular time segment and that are determined by using a source address, a source port, a destination address, a destination port, and a protocol type. The terminal device in this application may be a device having a network access function and an application software running capability, such as a portable computer, a server, or a mobile terminal. An identifier of the data stream refers to a 5-tuple including a source address, a source port, a destination address, a destination port, and a protocol identifier.

An application identification technology means that a network security device determines which application software in the terminal device sends a data stream.

In a method for identifying application information in network traffic provided in an embodiment of this application, some data streams that cannot be identified by using an existing application identification technology can be identified by means of interaction between the network security device and the terminal device, so that a proportion of network traffic that cannot be identified in total network traffic is reduced, and a success rate of application identification is improved; or some incorrect identification records can be identified, so that a false reporting rate is reduced, and accuracy of application identification is improved.

Embodiment 1

Figure 1A:
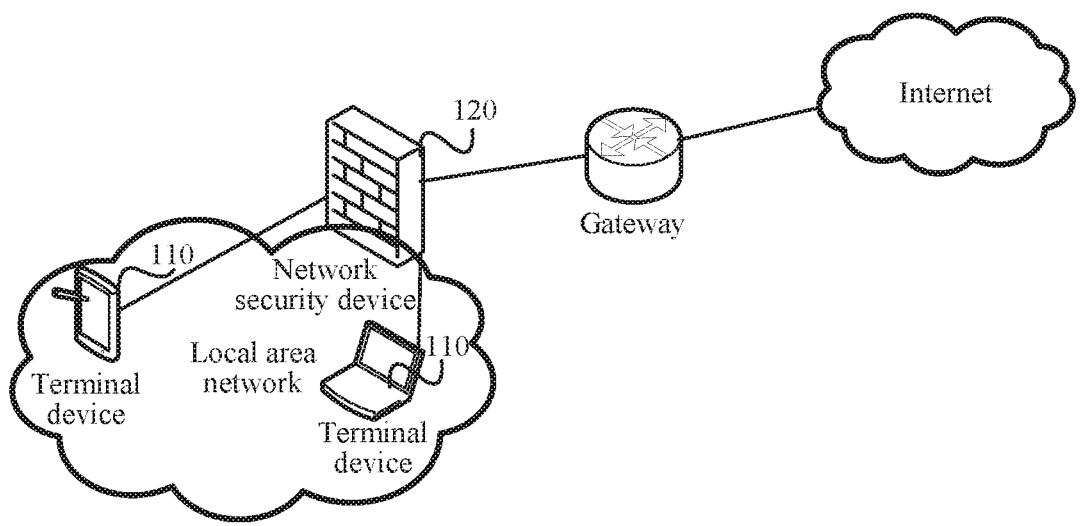
FIG. 1A is a schematic diagram of a system for identifying application information in network traffic according to an embodiment of this application.
Figure 1B:
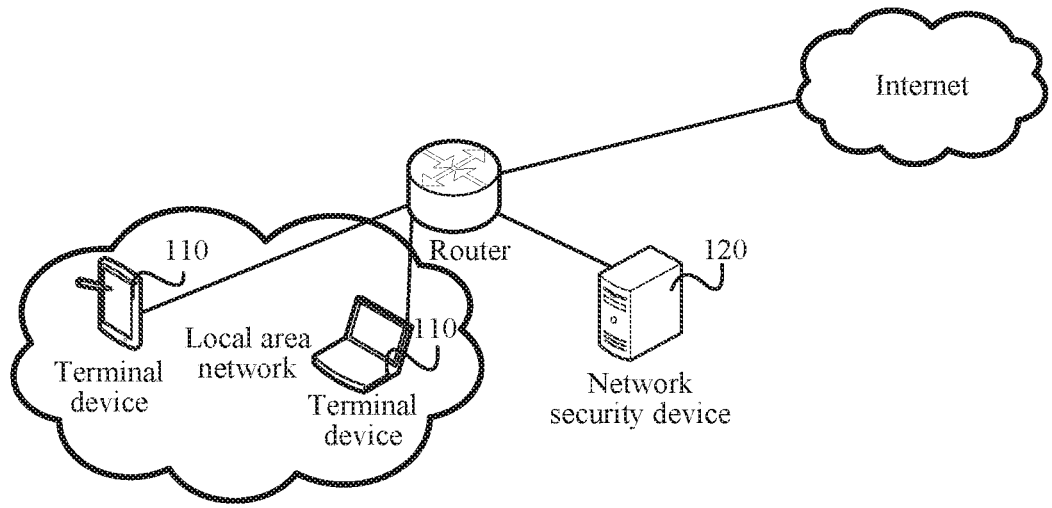
FIG. 1B is a schematic diagram of another system for identifying application information in network traffic according to an embodiment of this application.

FIG. 1A and FIG. 1B are schematic diagrams of a system for identifying application information in network traffic according to an embodiment of this application. The system includes a terminal device 110 and a network security device 120.

The network security device 120 may be deployed in two deployment manners. A first deployment manner is an in-path deployment manner shown in FIG. 1A. The network security device 120 is a device having a packet forwarding function. For example, the terminal device 110 may be a personal computer or a server located in a local area network, and the network security device 120 is a firewall device in the local area network. The terminal device 110 may alternatively be a personal computer or a server located in the Internet, and the network security device 120 is a security gateway in the Internet. In such a deployment manner, after obtaining a data stream flowing through the network security device 120, the network security device 120 determines an application that sends the data stream and that is in the terminal device. In subsequent description of this application, this process is also referred to as identifying, by the network security device 120, an application of a data stream flowing through the network security device 120 for short. Further, a security policy is stored in the network security device 120. After obtaining an application identification result of the data stream, the network security device 120 determines, according to the security policy, a subsequent processing manner for the data stream, for example, blocking the data stream or forwarding the data stream. A detailed process is described in the following embodiments with reference to examples.

A second deployment manner is an off-path deployment manner shown in FIG. 1B. The network security device 120 is a bypath device having a traffic statistics collection function, and configured to collect statistics on proportions of traffic of various applications in total traffic, and may further obtain ranking information of the various applications. The network security device 120 receives a mirrored data stream sent by a packet forwarding device, identifies an application of the mirrored data stream, updates a statistical record according to an identification result, and regularly outputs a statistical result.

Regardless of the in-path deployment manner shown in FIG. 1A or the off-path deployment manner shown in FIG. 1B, the network security device 120 needs to exchange messages with the terminal device 110. The following describes a function of the network security device 120 and a function of the terminal device 110. The function of the network security device 120 and the function of the terminal device 110 may be implemented respectively by a software module in the network security device 120 and a software module in the terminal device 110. For example, the following function of the network security device 120 is implemented by an application identification module in the network security device 120, and the function of the terminal device 110 is implemented by an agent in the terminal device 110.

The network security device 120 is configured to receive a first data stream, obtain an identifier of the first data stream, and send the identifier of the data stream to the terminal device 110 according to a source address or a destination address in the identifier of the first data stream, where an address of the terminal device 110 is the source address or the destination address in the identifier of the first data stream; receive an identifier of an application sent by the terminal device 110, and determine that the received identifier of the application is an identifier of an application sending the first data stream.

Optionally, the security policy is stored in the network security device 120. The security policy is a preconfigured rule about permitting forwarding of a particular data stream, or about forbidding forwarding of a particular data stream. For example, "permit Web browsing (WB)-default deny all" indicates that only forwarding of a data stream sent by a web browser is permitted, and forwarding of a data stream sent by another application is forbidden. For example, "deny QQ deny P2P-default permit all" indicates that forwarding of data streams sent only by instant messaging software QQ and P2P client software is forbidden, and forwarding of a data stream sent by another application is permitted. For a security policy configured to permit forwarding of some data streams, such a security policy includes an identifier of an application that is permitted to perform forwarding. For example, a security policy permits only forwarding of a data stream sent by a web browser, that is, an identifier of an application that is permitted to perform forwarding is an identifier WB of the web browser. After receiving a data stream, the network security device 120 forwards the data stream if the network security device 120 identifies that an identifier of an application sending the data stream is WB, or the network security device 120 blocks the data stream if the network security device 120 identifies that an identifier of an application sending the data stream is an identifier P2P of a P2P client rather than WB.

When receiving a packet of the first data stream, the network security device 120 first identifies the first data stream by using an existing application identification technology, such as a feature-based identification technology, a heuristic identification technology, or an association identification technology.

A security policy used to permit forwarding of a particular data stream is used as an example. If an identification result can be obtained, whether the security policy includes an identified identifier of an application is determined. The packet of the first data stream is forwarded if the security policy includes the identified identifier of the application, or the packet of the first data stream is blocked if the security policy does not include the identified identifier of the application. If the network security device 120 cannot obtain an identification result according to the foregoing existing application identification technology, that is, the identifier of the application sending the first data stream cannot be determined, the network security device 120 obtains the identifier of the first data stream, and sends the identifier of the first data stream to a terminal device identified by the source address in the identifier of the first data stream, or sends the identifier of the first data stream to a terminal device identified by the destination address in the identifier of the first data stream, so as to obtain an identifier of an application returned by the terminal device by means of interaction with the terminal device, and determine that the identifier of the application sending the first data stream is the identifier of the application returned by the terminal device.

It should be noted that the network security device may send, when the identification result cannot be obtained, the identifier of the first data stream to the terminal device identified by the source address in the identifier of the first data stream, or the identifier of the first data stream to the terminal device identified by the destination address in the identifier of the first data stream. Moreover, to improve identification accuracy, for example, when the association identification technology is used to perform application identification and an association identification rule is matched for the first time, to confirm accuracy of the association identification rule, the network security device may also send the identifier of the first data stream to the terminal device; compare an identifier of an application subsequently returned by the terminal device with an identification result obtained according to the association identification rule; and if the identifier of the application is the same as the identification result, determine that the association identification rule is correct.

The terminal device 110 is configured to obtain a first correspondence table and a second correspondence table. Each record in the first correspondence table stores an identifier of a process running on the terminal device 110 and an identifier of a data stream created by the process. The identifier of the data stream is a 5-tuple including a source address, a source port, a destination address, a destination port, and a protocol identifier.

Each record in the second correspondence table stores an identifier of an application and an identifier of a process created by the application. In this embodiment, an application is application software. After running an application, an OS creates at least one process, and each process implements a relatively independent function. That is, one application corresponds to at least one process. Usually, a process may be created and used by only one application. Only an extremely small quantity of system processes may be used by multiple applications, and this case is not taken into consideration in this application. These processes are not recorded in the first correspondence table and the second correspondence table.

For example, after an application named "Sogou input method" runs, a process named "SogouCloud.exe" and a process named "SogouSmartInfo.exe" are created. The process named "SogouCloud.exe" is used to obtain, from a network server, information such as an updated font library, and a display bar icon. The process named "SogouSmartInfo.exe" is used to obtain, from the network server, an intelligent association identification rule that is used to predict, according to a word spelled by a user, a word that is to be spelled by the user, so as to improve input efficiency.

After each process runs, according to design of program code, no data stream may be created, or one or more data streams may be created. That is, one process may correspond to one or more data streams.

The terminal device 110 receives the identifier, sent by the network security device, of the first data stream; finds, in the first correspondence table, a first record in which the identifier of the first data stream is stored, to obtain an identifier of a process in the first record; finds, in the second correspondence table, a second record in which the identifier of the process in the first record is stored, to obtain an identifier of an application from the second record; and sends the identifier of the application to the network security device.

Figure 2A:
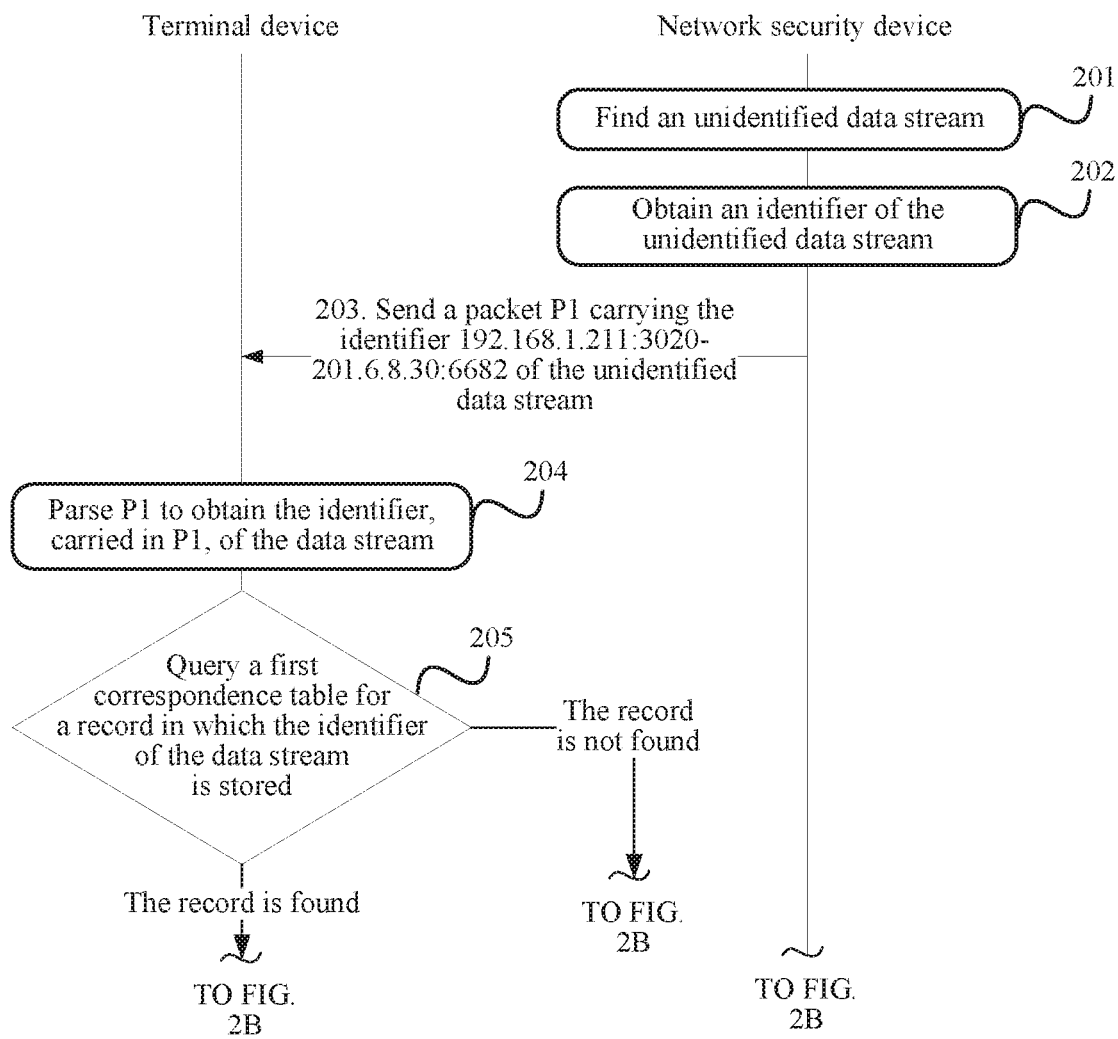
FIG. 2A and FIG. 2B are a flowchart of a method for identifying application information in network traffic according to an embodiment of this application.
Figure 2B:
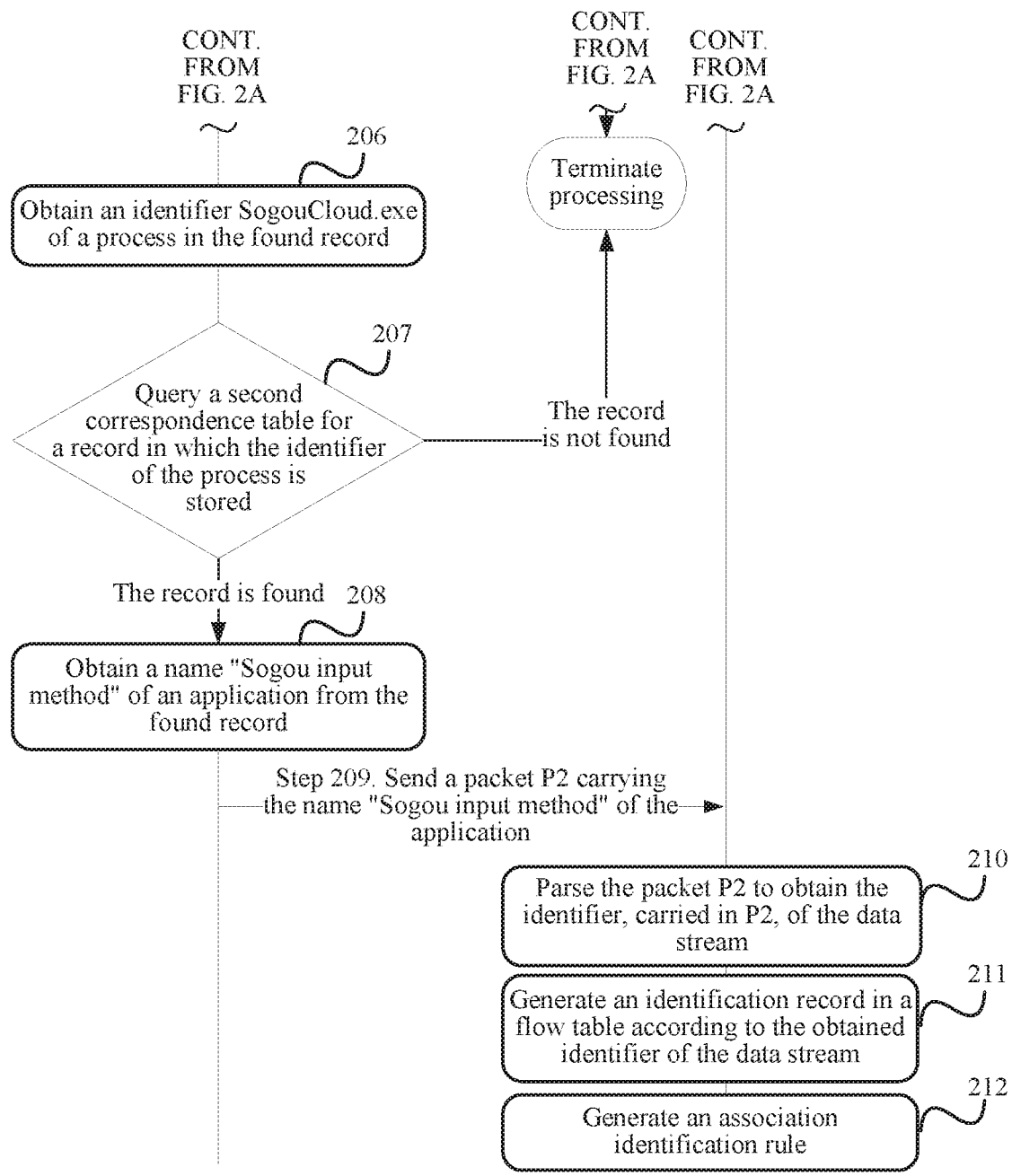

The following describes, by referring to FIG. 2A and FIG. 2B with reference to a specific example, a method for identifying application information in network traffic provided in the present invention. A network security device provided in this embodiment may be the network security device 120 in FIG. 1A or FIG. 1B.

Step 201: The network security device finds an unidentified data stream. Specifically, when performing application identification on the data stream, the network security device receives at least one packet of the data stream. For each packet of the data stream, after a feature in the packet is selectively cached according to a rule, the packet is forwarded. When a last packet indicating that the data stream is about to end, for example, a packet whose packet status identifier is FIN is received, or after a specified quantity of packets of a data stream are received and forwarded, if an application sending the data stream still cannot be identified by using an existing application identification technology, it is determined that the data stream is an unidentified data stream.

Step 202: The network security device obtains an identifier of the unidentified data stream. The network security device parses a packet of a cached unidentified data stream to obtain a 5-tuple of the packet, and uses the 5-tuple as the identifier of the unidentified data stream, where the 5-tuple includes a source IP address, a source port, a destination IP address, a destination port, and a protocol type. For example, information about the obtained 5-tuple is "tcp 192.168.1.211:3020-201.6.8.30:6682".

Step 203: The network security device encapsulates an identifier "tcp 192.168.1.211:3020-201.6.8.30:6682" of the data stream into a packet P1, and sends the packet P1 to a terminal device.

Optionally, the network security device may send the identifier "tcp 192.168.1.211:3020-201.6.8.30:6682" of the data stream to a terminal device whose IP address is 192.168.1.211, or send the identifier "tcp 192.168.1.211:3020-201.6.8.30:6682" of the data stream to a terminal device whose IP address is 201.6.8.30, or send the identifier "tcp 192.168.1.211:3020-201.6.8.30:6682" of the data stream to a terminal device whose IP address is 192.168.1.211 and a terminal device whose IP address is 201.6.8.30.

Because the terminal device whose IP address is 192.168.1.211 and the terminal device whose IP address is 201.6.8.30 may perform similar processing steps, for brevity, the following uses only the terminal device whose IP address is 192.168.1.211 as an example for description in this embodiment.

Step 204: The terminal device receives the packet P1 sent by the network security device, and parses the packet P1 to obtain the identifier "tcp 192.168.1.211:3020-201.6.8.30:6682", carried in the packet P1, of the data stream.

Step 205: The terminal device queries a first correspondence table for a record in which the identifier "tcp 192.168.1.211:3020-201.6.8.30:6682" of the data stream is stored; and if the record is found, performs step 206, or if the record is not found, terminates processing.

Step 206: The terminal device obtains, from the found record in which the identifier "tcp 192.168.1.211:3020-201.6.8.30:6682" of the data stream is stored, an identifier SogouCloud.exe that is of a process and that corresponds to the identifier "tcp 192.168.1.211:3020-201.6.8.30:6682" of the data stream.

The terminal device stores two correspondence tables. Each record in the first correspondence table stores an identifier of a process running on the terminal device and an identifier of a data stream created by the process. Each record in a second correspondence table stores an identifier of an application and an identifier of a process created by the application. Apparently, the terminal device may alternatively use one correspondence table to store correspondences between the three identifiers; an identifier of an application, an identifier of a process created by the application, and an identifier of a data stream created by the process. In this application, merely for convenience in subsequent description, a correspondence between the identifier of the process and the identifier of the data stream created by the process is stored in the first correspondence table, and a correspondence between the identifier of the application and the identifier of the process created by the application is stored in the second correspondence table. When a consolidated correspondence table is used to store the foregoing correspondences, the identifier of the application is stored in a first column, the identifier of the process created by the application is stored in a second column, and the identifier of the data stream created by the process is stored in a third column. In subsequent embodiments of this application, a process of querying the first correspondence table is equivalent to querying the first column and the second column of the consolidated correspondence table, and a process of querying the second correspondence table in the subsequent embodiments is equivalent to querying the second column and the third column of the consolidated correspondence table.

The first correspondence table stored in the terminal device is shown in Table 1. A process in which the terminal device obtains the first correspondence table will be subsequently described in detail with reference to a flowchart.

TABLE 1

| Identifier of a process | Identifier of a data stream |
|---|---|
| SogouCIoud.exe | tcp 192.168.1.211:3020-201.6.8.30:6682 |
| | tcp 192.168.1.211:3021-201.6.8.30:6682 |
| | tcp 192.168.1.211:3022-201.6.8.30:6682 |
| SogouSmartInfo.exe | tcp 192.168.1.211:3023-201.6.8.30:6683 |
| | tcp 192.168.1.211:3024-201.6.8.30:6683 |
| | tcp 192.168.1.211:3025-201.6.8.30:6683 |
| kxescore.exe | tcp 192.168.1.211:6120-168.3.56.120:1138 |
| kxetray.exe | tcp 192.168.1.211:6121-168.8.56.120:1138 |
| | tcp 192.168.1.211:6122-168.3.56.120:1138 |

The terminal device finds, in Table 1, that a record including the identifier "tcp 192.168.1.211:3020-201.6.8.30:6682" of the data stream is the record in the first row, and then obtains the identifier SogouCloud.exe of the process in the record in the first row.

Step 207: The terminal device queries a second correspondence table for a record in which the identifier Sogou-Cloud.exe of the process is stored; and if the record is found, performs step 208, or if the record is not found terminates processing.

Step 208: The terminal device obtains, from the found record in which the identifier SogouCloud.exe of the process is stored, an identifier that is of an application and that corresponds to the identifier SogouCloud.exe of the process. In this embodiment, the identifier may be a name "Sogou input method" of the application.

The second correspondence table stored in the terminal device is shown in Table 2. The second correspondence table may be collected by a software vendor of the agent. Research and development and design personnel may know, by using an installation package of application software, or a change of a process list after application software runs, which processes are started after the application software runs, so as to obtain a correspondence between an identifier of an application and an identifier of a process. Actually, to reduce storage space of the terminal device and improve execution efficiency, the software vendor does not need to collect all correspondences between identifiers of applications and identifiers of processes, and only needs to collect information about processes that are started by a common application easily causing missed reporting and false reporting in a process of identifying an application of network traffic. The agent in the terminal device may regularly obtain the second correspondence table from an upgrade website.

TABLE 2

| Identifier of an application | Identifier of a process |
|---|---|
| Sogou input method | SogouCloud.exe |
| | SogouSmartInfo.exe |
| Huawei Security Guard | kxescore.exe |
| | kxetray.exe |

The terminal device finds, in Table 2, that a record including the identifier SogouCloud.exe of the process is the record in the first row, and then obtains the name "Sogou input method" of the application in the record in the first row. An identifier of an application may be in multiple forms. For more visual description, this embodiment directly uses a name of an application to represent an identifier of the application. During practical application, to facilitate maintenance, the software vendor usually allocates a number to each application according to a preset allocation rule, and the number is used to represent an identifier of the application.

Step 209: The terminal device encapsulates the found name "Sogou input method" of the application into a packet P2, and sends the packet P2 to the network security device.

Because the network security device and the terminal device may perform multiple interactions in parallel to identify applications of multiple different data streams, for simple and convenient processing by the network security device, the terminal device may encapsulate, into a same packet, an identifier of a data stream and an identifier of an application determined according to the data stream, and send the packet to the network security device. In this example, the terminal device encapsulates the identifier "tcp 192.168.1.211:3020-201.6.8.30:6682" of the data stream and the name "Sogou input method" of the application into the packet P2, and sends the packet P2 to the network security device.

Step 210: The network security device receives the packet P2 sent by the terminal device, and parses the packet P2 to obtain the identifier "tcp 192.168.1.211:3020-201.6.8.30:6682" of the data stream and the name "Sogou input method" of the application that are carried in the packet P2.

Step 211: The network security device finds a corresponding record in a flow table according to the identifier, carried in P2, of the data stream, and fills the name, carried in P2, of the application into the table as an identification result.

The network security device maintains a flow table. Each record in the flow table corresponds to a data stream, and records related information, such as a status and an identification result, of the data stream. In this step, the network security device obtains an identification record "tcp 192.168.1.211:3020-201.6.8.30:6682 Sogou input method".

Optionally, after the network security device obtains the identification record in step 211, to reduce multiple subsequent interactions between the network security device and the terminal device for a data stream of a same identifier, the network security device may generate an association identification rule.

Step 212: The network security device generates a first association identification rule and a second association identification rule, where the first association identification rule includes the identifier of the application, and a 3-tuple including a destination address, a destination port, and a protocol identifier of a first data stream, and the second association identification rule includes the identifier of the application, and a 3-tuple including a source address, a source port, and the protocol identifier of the first data stream.

When the network security device subsequently receives another data stream, for example, a second data stream, if at least one of a destination 3-tuple or a source 3-tuple of the second data stream is consistent with a 3-tuple included in either of the first association identification rule and the second association identification rule, the network security device determines that an identifier of an application sending the second data stream is an identifier of an application included in either of the association identification rules.

In this embodiment, the first association identification rule is "tcp 201.6.8.30:6682 Sogou input method", and the second association identification rule is "tcp 192.168.1.211:3020 Sogou input method".

Subsequently, another terminal device sends a second data stream. When receiving a packet P3 in the second data stream, the network security device extracts an identifier "tcp 192.168.1.100:3020-201.6.8.30:6682" of the second data stream and a destination 3-tuple "tcp 201.6.8.30:6682" of the second data stream according to the packet P3. Because the destination 3-tuple of the second data stream is the same as a 3-tuple in the first association identification rule, the network security device may directly determine, according to the first association identification rule without interaction with the terminal device again, that an application sending the second data stream is "Sogou input method".

In the system for identifying application information in network traffic provided in this embodiment of this application, when receiving a data stream, the network security device obtains an identifier of the data stream, and sends the identifier of the data stream to the terminal device. The terminal device finds, in the stored first correspondence table, an identifier that is of a process and that corresponds to the identifier of the unidentified data stream; finds an identifier of an application in the second correspondence table, where the identifier of the application corresponds to the identifier that is of the process and that corresponds to the identifier of the unidentified data stream; and sends the found identifier of the application to the network security device. The network security device determines an application identification result of the data stream according to a feedback from the terminal device. In comparison with the prior art, in the foregoing system, more applications can be identified by means of interaction between the network security device and the terminal device, so that a proportion of unidentified traffic in total traffic is reduced, and an effect of identifying network traffic is improved.

Figure 3A:
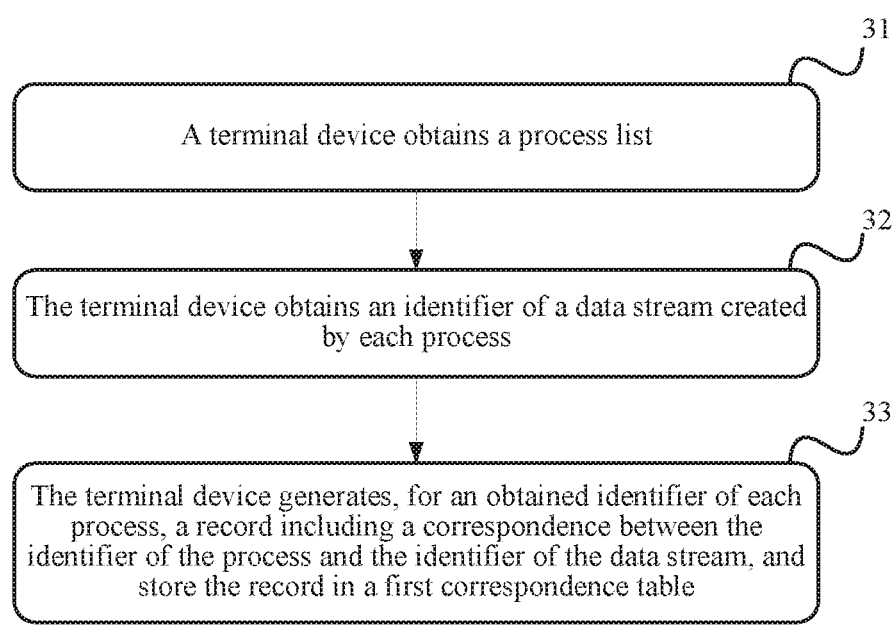
FIG. 3A is a flowchart of obtaining a first correspondence table according to an embodiment of this application.

Referring to FIG. 3A, the terminal device in the foregoing embodiment may obtain the first correspondence table shown in Table 1 in the following manner.

Step 31: The terminal device obtains a process list.

The terminal device obtains, by using an interface provided by an operating system (OS) running on the terminal device, the list of processes running on the terminal device. A "process" in this application refers to an instance of a running program, and is a running activity, about a data set, of a program having a particular independent function. A process is a basic unit for dynamic execution by the OS. In a conventional OS, a process is not only a basic resource allocation unit, but also a basic execution unit.

Most OSs may provide an application programming interface (API) or a command line command, for an application or an operator to obtain a list of processes running on a terminal device. For example, a list of running processes may be obtained by invoking a "ps" command in a Linux operating system; and a list of running processes may be obtained by invoking an EnumProcesses function in a Windows operating system.

Step 32: The terminal device obtains an identifier of a data stream created by each process.

For each process in the process list, the terminal device obtains, by using an interface provided by the OS, a currently active connection that is established by the process by enabling a port. For example, connections enabled by the process may be traversed by using a "/proc" virtual file system in the Linux operating system. In the Windows operating system, all correspondences between TCP data streams and processes may be obtained by using a GetExtendedTcpTable function, and all correspondences between UDP data streams and processes may be obtained by using a GetExtendedUdpTable function.

Each currently active connection is used as a data stream, and a 5-tuple of the active connection is used as the identifier of the data stream.

Step 33: The terminal device generates, for each obtained identifier of a process, a record including an identifier of the process and the identifier of the data stream, and stores the record into the first correspondence table. Therefore, the first correspondence table is obtained.

Figures 1, 3B:
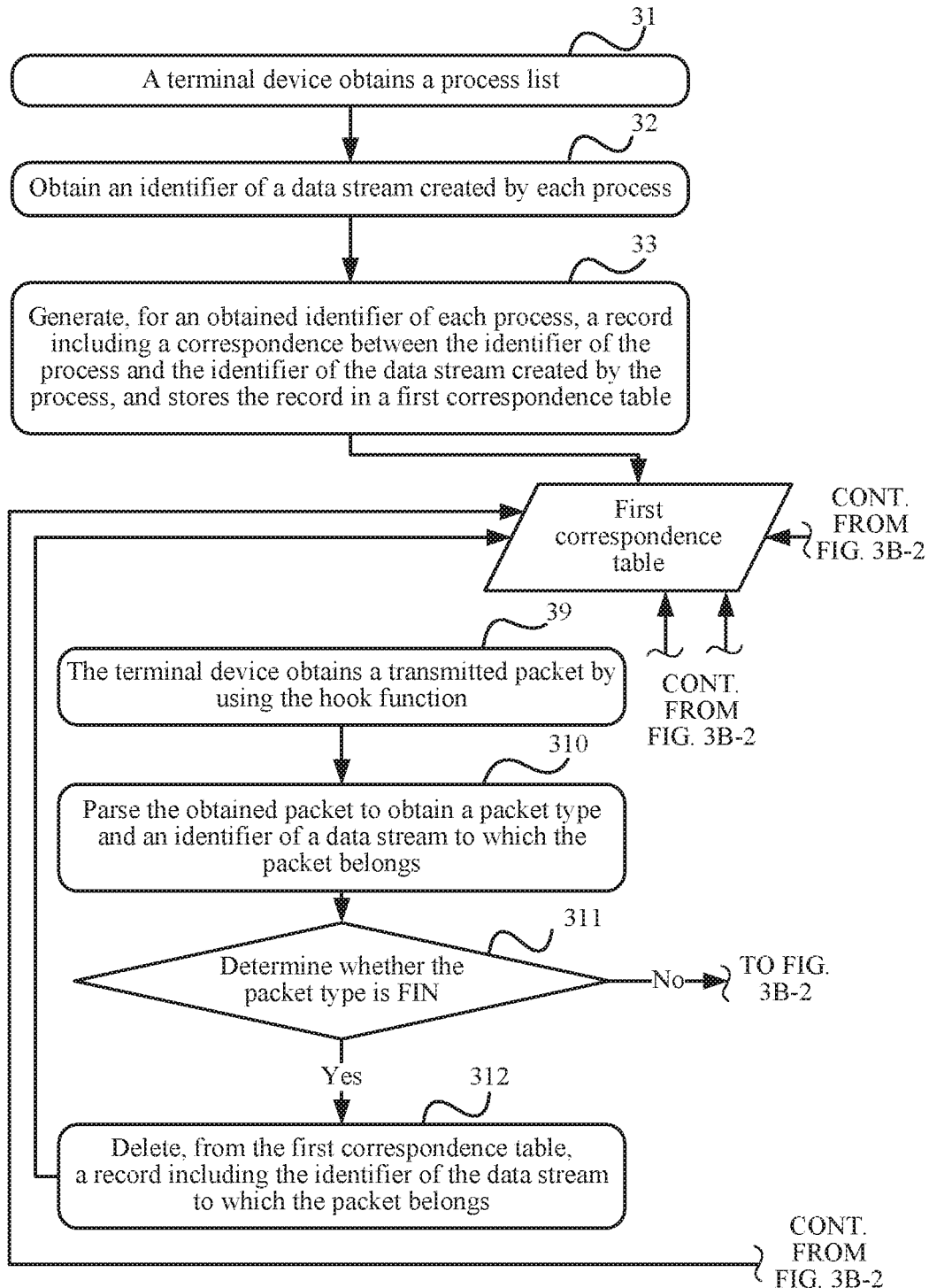
FIG. 3B-1 and FIG. 3B-2 are a flowchart of updating a first correspondence table according to an embodiment of this application.
Figures 2, 3B:
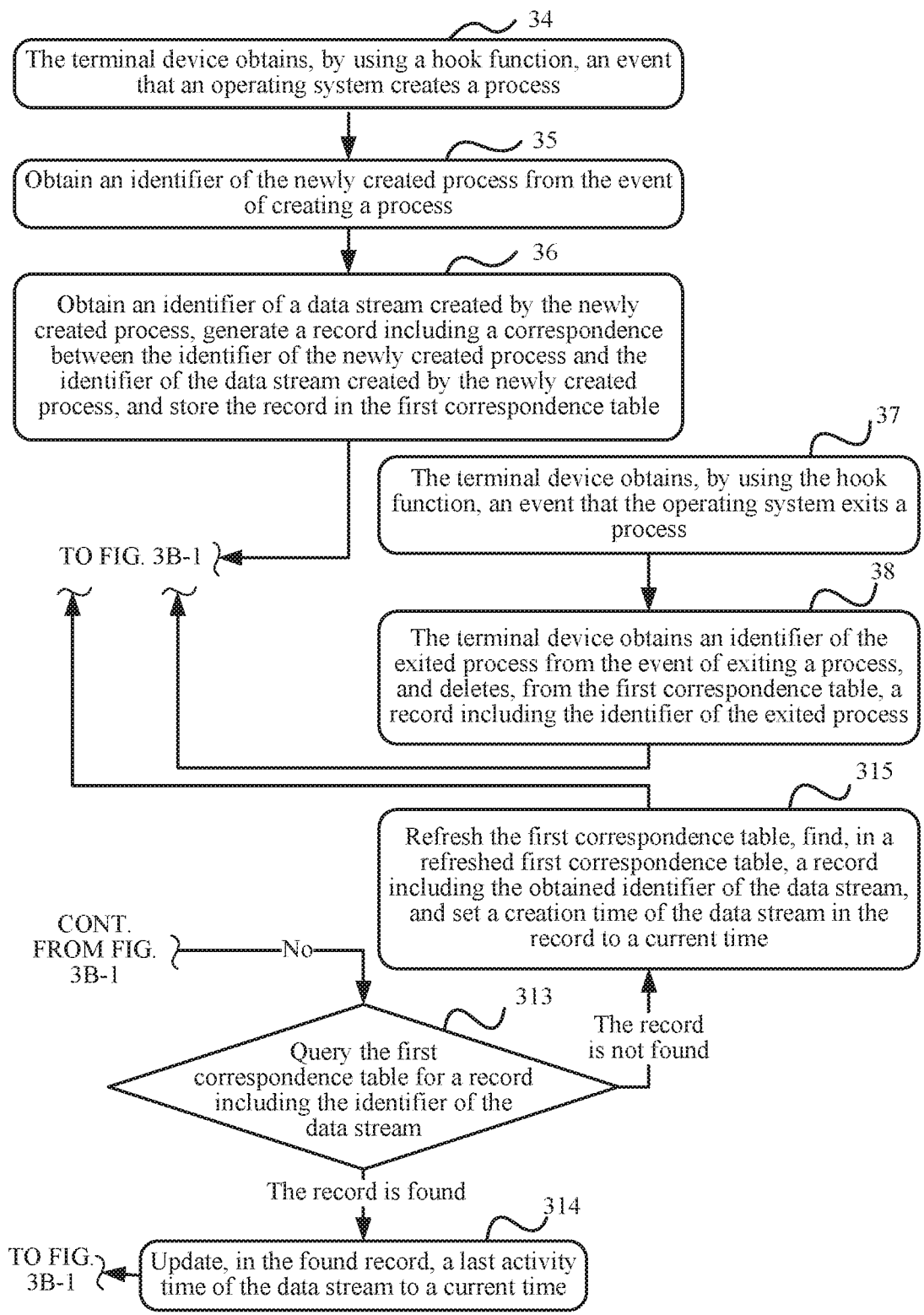

Optionally, the OS system may create or exit a process at any time according to use activity of a user. In order to update and maintain the first correspondence table in real time, so as to improve a probability that the terminal device finds a corresponding application according to an identifier, sent by the network security device, of an unidentified data stream, the terminal device monitors a status of the process by using a hook function, thereby updating the record in the first correspondence table. FIG. 3B-1 and FIG. 3B-2 are a flowchart of a process of updating the first correspondence table according to this embodiment.

Step 31 to step 33 in FIG. 3B-1 and FIG. 3B-2 are similar to those in FIG. 3A. For brevity, description is not repeated herein.

Step 34: The terminal device obtains, by using a hook function, an event that an operating system creates a process.

The hook function is a part of a Windows message processing mechanism. By setting a "hook", the agent or another application can filter all messages and events at a system level, and access a message that cannot be accessed in a normal circumstance. The hook function is essentially a program used for processing system messages. The hook function is loaded onto a system by means of system invoking.

Step 35: The terminal device obtains an identifier of a newly created process from the event of creating a process. The terminal device obtains, by using the interface provided by the OS, a currently active connection established by the newly created process by enabling a port. Each currently active connection is used as a data stream, and a 5-tuple of the currently active connection is used as an identifier of the data stream.

Step 36: The terminal device obtains an identifier of a data stream created by the newly created process, generates a record including the identifier of the newly created process and the identifier of the data stream created by the newly created process, and stores the record into the first correspondence table.

Step 37: The terminal device obtains, by using the hook function, an event that the operating system exits a process.

Step 38: The terminal device obtains an identifier of an exited process from the event of exiting a process, and deletes, from the first correspondence table, a record including the identifier of the exited process.

Optionally, in order to update and maintain the first correspondence table in real time, the terminal device may further monitor a network packet by using the hook function, thereby updating the record in the first correspondence table, and adding information about a creation time and a last activity time of the data stream to each record. It may be learned from subsequent steps of this embodiment that the last activity time of the data stream may be used for aging the record in the first correspondence table, and the creation time of the data stream may be used for analysis of another purpose, as shown in step 39 to step 315.

Step 39: The terminal device obtains, by using the hook function, a transmitted packet, which may be specifically a sent packet or a received packet. In order to further reduce a subsequent data processing amount, only packets whose protocol type is the Transmission Control Protocol (TCP) or the User Datagram Protocol (UDP) may be captured.

Step 310: The terminal device parses the obtained packet to obtain a packet status identifier and an identifier of a data stream to which the packet belongs. Specifically, the status identifier in this embodiment is a status identifier of a layer 4 protocol. The layer 4 protocol may be obtained from a protocol field of an IP header of the packet, and may be, for example, the TCP or the UDP. A status identifier of the TCP may be obtained from a flags field of a TCP header of the packet. The status identifier may be FIN, RST, or the like. For a more detailed description of the packet status identifier, refer to an RFC document, such as RFC 793.

The terminal device extracts a 5-tuple from the obtained packet, and uses the extracted 5-tuple as the identifier of the data stream to which the packet belongs.

Step 311: The terminal device determines whether the packet status identifier of the packet is FIN, and if the packet status identifier of the packet is FIN, performs step 312, or if the packet status identifier of the packet is not FIN, performs step 313.

Step 312: If the packet status identifier is FIN, delete, from the first correspondence table, a record including the identifier of the data stream to which the packet belongs, and the processing ends.

Step 313: The terminal device queries, according to obtained identifier of the data stream, the first correspondence table shown in Table 1 for the record including the identifier of the data stream. If the record is found, it indicates that the packet belongs to a created data stream, and step 314 is performed. If the record is not found, it indicates that the packet belongs to a newly created data stream, and step 315 is performed.

Step 314: The terminal device updates, in the found record, a last activity time of the data stream to a current time.

Actually, a manner of deleting an expired record according to the last activity time of the data stream and a manner of deleting a record according to the packet status identifier FIN are two optional record deletion manners that may coexist.

For example, a TCP packet P4 is obtained by using the hook function, and a 5-tuple extracted from the packet P4 is "tcp 192.168.1.211:6122-168.3.56.120:1138". A record that includes the 5-tuple "tcp 192.168.1.211:6122-168.3.56.120:1138" and that is found in Table 1 is the ninth record. A last activity time in the ninth record is updated to a current time 21:00:3456. An updated first correspondence table is shown in Table 3.

TABLE 3

| Identifier of a process | Identifier of a data stream | Creation time | Last update time |
| --- | --- | --- | --- |
| SogouCloud.exe | tcp 192.168.1.211:3020-201.6.8.30:6682 | ... | ... |
| | tcp 192.168.1.211:3021 -201.6.8.30:6682 | ... | ... |
| | tcp 192.168.1.211:3022-201.6.8.30:6682 | ... | ... |
| SogouSmartInfo.exe | tcp 192.168.1.211:3023-201.6.8.30:6683 | ... | ... |
| | tcp 192.168.1.211:3024-201,6.8.30:6683 | ... | ... |
| | tcp 192.168.1.211:3025-201.6.8.30:6683 | ... | ... |
| kxescore.exe | tcp 192.168.1.211:6120-168.3.56.120:1138 | ... | ... |
| kxetray.exe | tcp 192.168.1.211:6121-168.3.56.120:1138 | ... | ... |
| | tcp 192.168.1.211:6122-168.3.56.120:1138 | ... | 21:00:3456 |

Step 315: The terminal device refreshes the first correspondence table, finds, in a refreshed first correspondence table, a record including the identifier of the data stream that is obtained in step 310, and sets a creation time and a last activity time of the data stream in the record to the current time.

For most OSs, a process creating a data stream identified by a 5-tuple cannot be found directly according to the 5-tuple. In this case, the OS system needs to refresh a process list again; re-obtains, for each process in a refreshed process list, all connections established by the process, so as to obtain a refreshed first correspondence table; and then finds, in the refreshed first correspondence table according to the identifier of the data stream that is obtained in step 310, the record including the identifier of the data stream that is obtained in step 310.

For example, the terminal device obtains a TCP packet P5 by using the hook function, and a 5-tuple extracted from the packet P5 is "tcp 192.168.1.211:6123-168.3.56.120:1138". A record including the 5-tuple "tcp 192.168.1.211:6123-168.3.56.120:1138" is not found in Table 1, and the first correspondence table is refreshed. As shown in Table 4, a record that includes the 5-tuple "tcp 192.168.1.211:6123-168.3.56.120:1138" and that is found in Table 4 is the tenth record, and a creation time and a last activity time in the tenth record are both set to a current time 21:01:3456. A refreshed first correspondence table is shown in Table 4.

TABLE 4

| Identifier of a process | Identifier of a data stream | Creation time | Last update time |
|---|---|---|---|
| SogouCIoud.exe | tcp 192.168.1.211:3020-201.6.8.30:6682 | ... | ... |
| | tcp 192.168.1.211:3021-201.6.8.30:6682 | ... | ... |
| | tcp 192.168.1.211:3022-201.6.8.30:6682 | ... | ... |
| SogouSmartlnfo.exe | tcp 192.168.1.211:3023-201.6.8.30:6683 | ... | ... |
| | tcp 192.168.1.211:3024-201.6.8.30:6683 | ... | ... |
| | tcp 192.168.1.211:3025-201.6.8.30:6683 | ... | ... |
| kxescore.exe | tcp 192.168.1.211:6120-1 68.3.56.120:1138 | ... | ... |
| kxetray.exe | tcp 192.168.1.211:6121 -168.3.56.120:1138 | ... | ... |
| | tcp 192.168.1.211:6122-168.3.56.120:1138 | ... | 21:00:3456 |
| | tcp 192.168.1.211:6123-168.3.56.120:1138 | 21:01:3456 | 21:01:3456 |

Optionally, to reduce storage space occupied by the first correspondence table in the terminal device, the terminal device may periodically delete an expired record according to a last activity time that is of a data stream and that is in the first correspondence table. An expired record is a record in which a time interval between a last activity time that is of a data stream and that is included in the expired record and a current time exceeds a predetermined time interval. That is, the expired record is a record corresponding to a data stream that is inactive for a long time.

The terminal device determines whether a predetermined time that is determined according to a detection period is reached, and if the predetermined time is reached, executes a periodic remove task, that is, for each record in the first correspondence table in Table 4, the terminal device determines whether a time interval between a last activity time of a data stream and a current time exceeds a specified threshold. If the time interval exceeds the specified threshold, the terminal device deletes the record. If the predetermined time is not reached, the terminal device returns to step 301.

It should be noted that, in FIG. 3B-1 and FIG. 3B-2, a first sub-procedure including step 31 to step 33, a second sub-procedure including step 34 to step 36, a third sub-procedure including step 37 to step 38, and a fourth sub-procedure including step 39 to step 315 are independent of each other, and may be optionally performed. For example, only the first sub-procedure and the second sub-procedure may be performed, or only the first sub-procedure and the third sub-procedure may be performed.

Optionally, according to the solution provided in this embodiment, a proportion of traffic that cannot be identified in total traffic may be greatly reduced by means of interaction between the network security device and the terminal device. However, in comparison with a manner in the prior art in which the network security device performs application identification according to a locally stored rule, the solution provided in this embodiment requires interaction between the network security device and the terminal device, and consequently, a required delay is relatively long, and a particular network transmission resource is consumed. If multiple complete data streams sent by a process sending data streams that cannot be identified by the network security device can be obtained, a rule may be obtained by means of manual analysis. For a feature-based identification rule obtained by means of manual analysis, or a heuristic identification rule, obtaining multiple complete data streams sent by a same application is crucial. The complete data stream refers to all packets from a first packet sent by two communication parties during a connection establishment negotiation stage to a last packet sent before a connection is disconnected. However, for considerations of storage space and performance, an existing network security device cannot cache multiple packets of a data stream. For example, in an existing feature-based identification technology or heuristic identification technology, an extracted feature is usually just cached after the feature is extracted from a received packet, thereby forwarding the packet. Capturing a complete unidentified data stream by using a packet capture technology of an existing terminal device is relatively difficult, because which data stream is to be captured cannot be determined, and it is difficult to correctly locate a start and an end of an unidentified data stream. If all packets sent and received by a terminal device within quite a long time are stored for capturing an unidentified data stream, a storage resource and a processing resource of the terminal device are greatly occupied. However, if a sampling packet capture technology is used, a resource is saved, but a large part of data packets of a data stream are missed. This causes difficult or incorrect rule extraction. For this problem, this application provides a solution shown in FIG. 4A and FIG. 4B. According to the solution, all packets of a data stream sent by a process can be captured in a targeted manner, and occupation of a large quantity of resources in the terminal device is avoided.

Figure 4A:
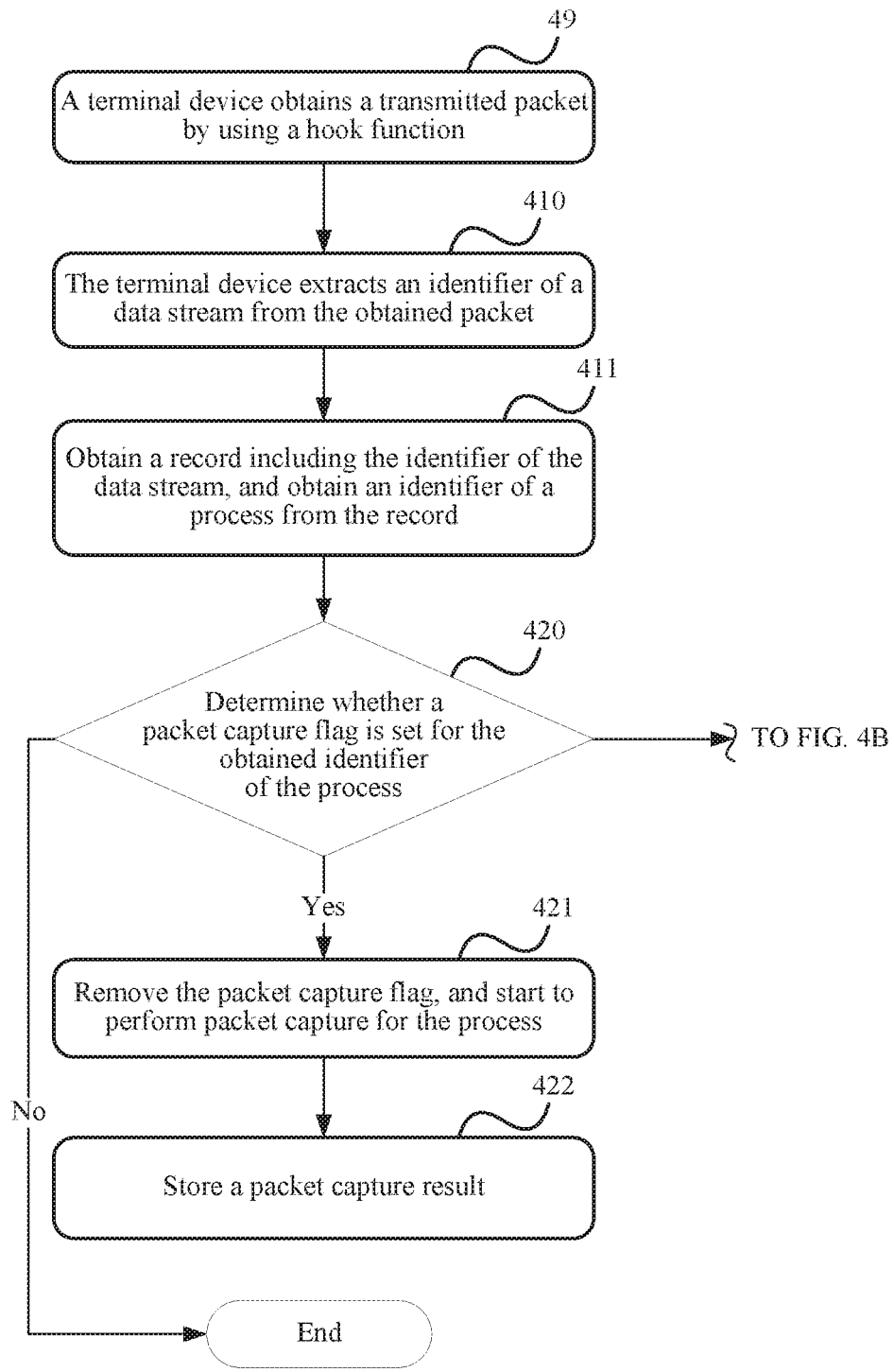
FIG. 4A and FIG. 4B are a flowchart of obtaining a complete data stream according to an embodiment of this application.
Figure 4B:
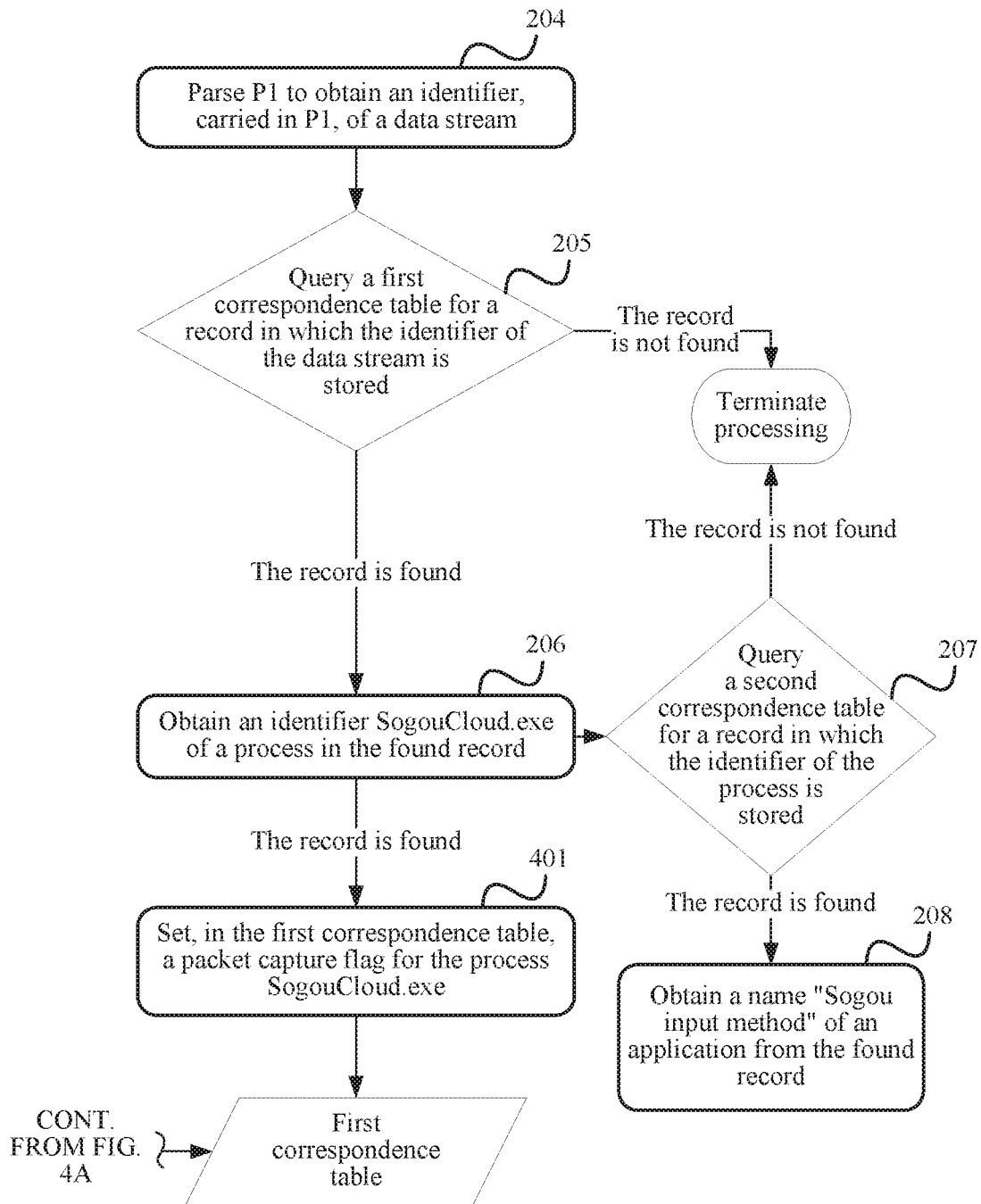

Optionally, in FIG. 4A and FIG. 4B, which is based on FIG. 2A and FIG. 2B, after step 206, that is, after the terminal device receives the packet P1 sent by a network security device, and determines that the identifier of the process creating the data stream whose identifier is "tcp 192.168.1.211:3020-201.6.8.30:6682" is SogouCloud.exe, the following steps are further included.

Step 401: The terminal device sets, in the first correspondence table shown in Table 1, a packet collection flag for the process SogouCloud.exe. The packet collection flag is used to instruct the terminal device to obtain and store, after capturing by using the interface of the operating system a packet transmitted by the process, a complete data stream subsequently transmitted by the process. The following describes a function of the packet collection flag with reference to a specific example. A first correspondence table obtained after the packet collection flag is set is shown in Table 5.

TABLE 5

| identifier of a process | Packet collection flag | Identifier of a data stream |
|---|---|---|
| SogouCloud.exe | 1 | tcp 192.168.1.211J020-201.6.8.30:6682 |
| | | tcp 192.168.1.211:3021-201.6.8.30:6682 |
| | | tcp 192.168.1.211:3022-201.6.8.30:6682 |

TABLE 5-continued

| identifier of a process | Packet collection flag | Identifier of a data stream |
|---|---|---|
| SogouSmartInfo.exe | | tcp 192,168.1.211:3023-201.6.8.30:6683 |
| | | tcp 192.168.1.211:3024-201.6.8.30:6683 |
| | | tcp 192.168.1.211:3025-201.6.8.30:6683 |
| kxescore.exe | | tcp 192.168.1.21.1:6120-168.3.56.120:1138 |
| kxetray.exe | | tcp 192.168.1.211:6121-168.3.56.120:1138 |
| | | tcp 192.168.1211:6122-168.3.56.120:1138 |

In this embodiment, that the packet collection flag is 1 is used as an example for description. In a specific implementation process, packet collection flags corresponding to identifiers of all processes may be set to "0" when the first correspondence table is initially generated. A packet collection flag corresponding to an identifier of a process in a found record is updated to "1" after step 206. Certainly, another setting manner may be used, provided that a different flag value can be set for the identifier of the process in the found record after step 206.

Step 49: The terminal device obtains, by using the hook function, a transmitted packet, which may be specifically a sent packet or a received packet. This step is similar to step 39 in FIG. 3B-1 and FIG. 3B-2, and details are not described herein again.

Step 410: The terminal device extracts an identifier of a data stream from the obtained packet. Specifically, the terminal device extracts a 5-tuple from the obtained packet.

Step 411: The terminal device queries, according to the obtained identifier of the data stream, the first correspondence table shown in Table 5 for a record including the identifier of the data stream. If the record is found, the record may be updated according to step 314 in FIG. 3B-1 and FIG. 3B-2. If the record is not found, it indicates that the packet belongs to a newly created data stream, and the terminal device refreshes the first correspondence table, and finds, in a refreshed first correspondence table, a record including the identifier of the data stream that is obtained in step 310.

For example, the terminal device obtains a TCP packet P6 by using the hook function, and a 5-tuple extracted from the packet P6 is "tcp 192.168.1.211:3011-201.6.8.30:6682". A record including the 5-tuple "tcp 192.168.1.211:3011-201.6.8.30:6682" is not found in Table 5, and the terminal device refreshes the first correspondence table. As shown in Table 6, a record including the 5-tuple "tcp 192.168.1.211:3011-201.6.8.30:6682" is the first record.

TABLE 6

| Identifier of a process | Packet collection flag | identifier of a data stream |
|---|---|---|
| SogouCloud.exe | 1 | tcp 192.168.1.211:3011 -201.6.8.30:6682 |
| | | tcp 192.168.1.211:3020-201.6.8.30:6682 |
| | | tcp 192.168.1.211:3021-201.6.8.30:6682 |
| | | tcp 192.168.1.211:3022-201.6.8.30:6682 |
| SogouSmartInfo.exe | | tcp 192.168.1.211:3023-201.6.8.30:6683 |
| | | tcp 192.168.1.211:3024-201.6.8.30:6683 |
| | | tcp 192.168.1.211 3025-201.6.8.30:6683 |
| kxescore.exe | | tcp 192.168.1.211:6320-168.3.56.120:1138 |
| kxetray.exe | | tcp 192.168.1.211:6321-168.3.56.120:1138 |
| | | tcp 192.168.1.211:6122-168.3.56.120:1138 |

Regardless of whether the record including the identifier of the data stream is found in the first correspondence table, the record including the identifier of the data stream may be obtained after step 411. An identifier of a process is obtained from the record. In this embodiment, the obtained identifier of the process is SogouCloud.exe.

Step 420: The terminal device determines whether a packet collection flag is set for the identifier SogouCloud.exe of the process in the first record. If the packet collection flag is set for the identifier, step 421 is performed. If the packet collection flag is not set for the identifier, the procedure ends.

Step 421: The terminal device removes the packet collection flag, and starts to perform packet capture on the process whose identifier is SogouCloud.exe.

According to this embodiment, the terminal device removes the packet collection flag in Table 6, to obtain Table 7. A purpose of removing the packet collection flag is to avoid long-term packet capture for a process.

TABLE 7

| Identifier of a process | Packet collection flag | Identifier of a data stream |
|---|---|---|
| SogouCloud.exe | | tcp 192.168.1.211:3011 -201.6.8.30:6682 |
| | | tcp 192.168.1.211:3020-201.6.8.30:6682 |
| | | tcp 192.168.1.211:3021 -201.6.8.30:6682 |
| | | tcp 192.168.1.211:3022-201.6.8.30:6682 |
| SogouSmartInfo.exe | | tcp 192.168.1.211:3023-201.6.8.30:6683 |
| | | tcp 192.168.1.211:3024-201.6.8.30:6683 |
| | | tcp 192.168.1.211:3025-201.6.8.30:6683 |
| kxescore.exe | | tcp 192.168.1.211:6120-168.3.56.120:1138 |
| kxetray.exe | | tcp 192.168.1.211:6121-168.3.56.120:1138 |
| | | tcp 192.168.1.211:6122-168.3.56.120:1138 |

Optionally, to further avoid long-term packet capture for a same process, a packet capture time interval may be set. Before performing step 421, the terminal device determines whether a time interval between a current time and a time when a packet capture action is previously performed on the same process exceeds a specified packet capture time interval: and if the time interval exceeds the specified packet capture time interval, performs packet capture; or if the time interval does not exceed the specified packet capture time interval, skips this step, that is, temporarily skips removing a packet capture flag and temporarily skips performing packet capture, and ends the current processing.

Step 422: The terminal device stores a packet capture result, to facilitate subsequent manual analysis. When specifically implementing packet capture on a particular process, the terminal device may perform packet capture according to a specified packet capture policy. For example, the terminal device ends packet capture after capturing data packets that are transmitted by the process within a preset time segment, or ends packet capture after data packets that are transmitted by the process and that are captured reach a preset data volume.

It should be noted herein that a method for updating the first correspondence table shown in FIG. 3B-1 and FIG. 3B-2 and a packet capture method shown in FIG. 4A and FIG. 4B may be performed independently, or may be performed in a combined manner.

According to the foregoing packet capture method provided in this embodiment, multiple complete data streams about a particular process can be obtained in the terminal device for subsequent manual analysis, so as to obtain a feature-based identification rule or a heuristic identification rule. After the obtained rule is applied to the network security device, an application identification effect may be improved.

Figure 5A:
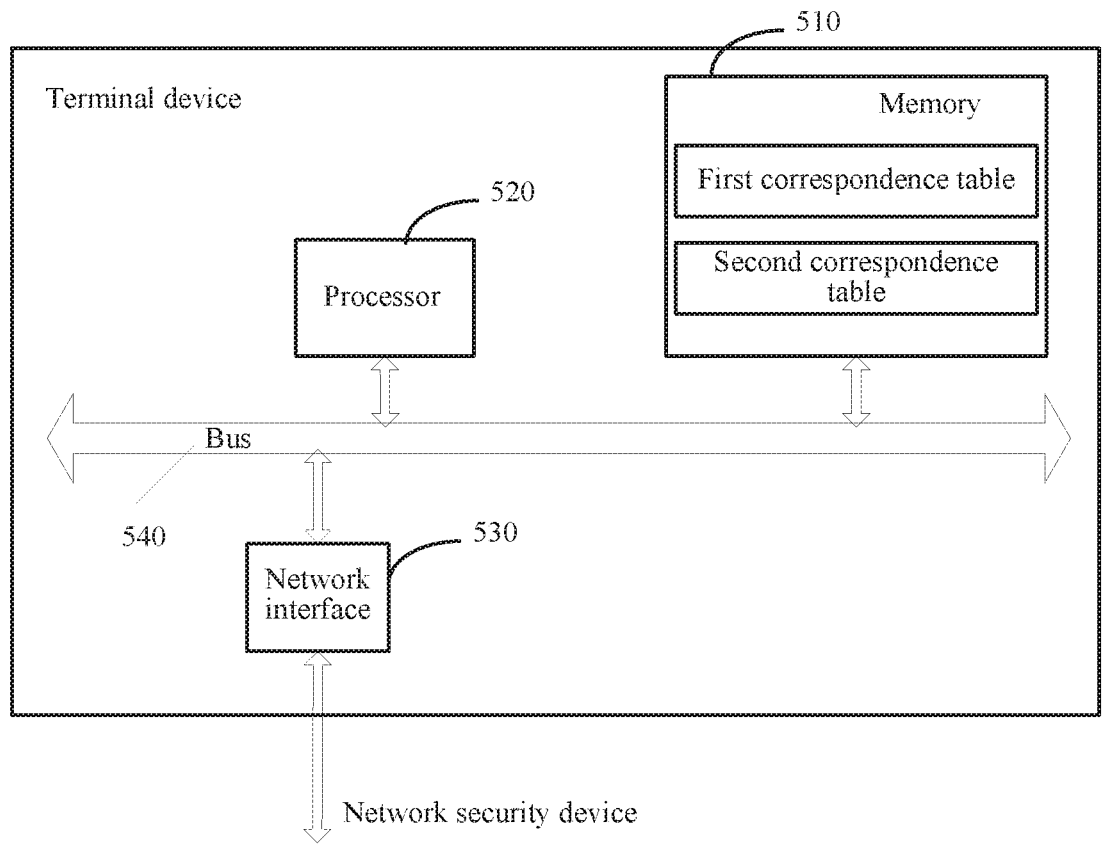
FIG. 5A is a schematic structural diagram of a terminal device according to an embodiment of this application.

An embodiment of this application further provides a terminal device. As shown in FIG. 5A, the terminal device includes a memory 510, a processor 520, and a network interface 530, and the memory 510, the processor 520, and the network interface 530 communicate with each other by using a bus 540.

The memory 510 includes but is not limited to a random access memory (RAM), a read-only memory (ROM), an erasable programmable read-only memory (EPROM or a flash memory), or a portable read-only memory (CD-ROM).

The processor 520 may be one or more central processing units (CPU). When the processor 520 is one CPU. The CPU may be a single-core CPU, or may be a multi-core CPU.

The network interface 530 may be a wired interface, for example, a fiber distributed data interface (FDDI) or a Gigabit Ethernet (GE) interface, or the network interface 530 may be a wireless interface. If the terminal device is a personal computer, the network interface 530 may be the foregoing wired interface or an IEEE 802.11b-based wireless local area network (Wireless Fidelity, WiFi) module. If the terminal device is a mobile terminal such as a mobile phone, the network interface 530 may be a hardware module including a baseband chip and an RF antenna.

The memory 510 is configured to store program code, a first correspondence table, and a second correspondence table. For definitions of the first correspondence table and the second correspondence table, refer to the description in the foregoing embodiment. Details are not described herein again.

The network interface 530 is configured to receive an identifier, sent by a network security device, of a first data stream.

The processor 520 reads the program code stored in the memory 510, to perform the following steps:

finding, in the first correspondence table, a first record in which the identifier of the first data stream is stored, to obtain an identifier of a process in the first record; and finding, in the second correspondence table, a second record in which the identifier of the process in the first record is stored, to obtain an identifier of an application from the second record.

The network interface 530 is further configured to send the identifier of the application obtained by the processor 520 to the network security device.

Optionally, the processor 520 may obtain the first correspondence table and update the first correspondence table by using the method according to FIG. 3A and FIG. 3B and related description.

Optionally, the processor 520 may obtain packets of a complete data stream by using the method according to FIG. 4A and FIG. 4B and related description.

Figure 5B:
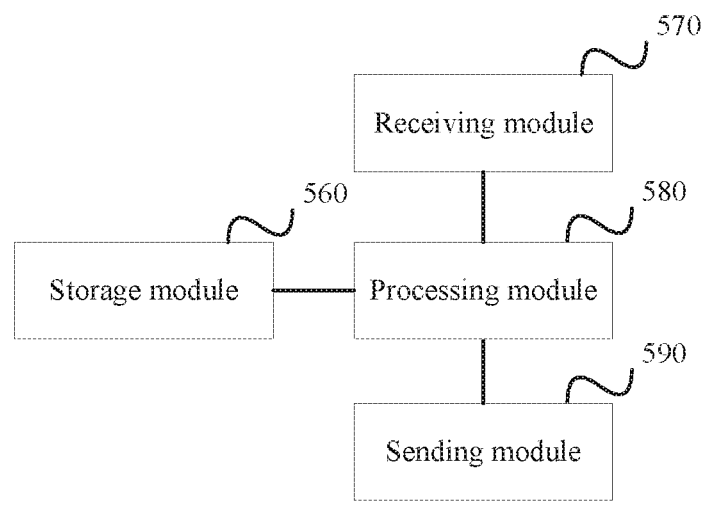
FIG. 5B is a schematic structural diagram of another terminal device according to an embodiment of this application.

An embodiment of this application further provides a terminal device, as shown in FIG. 5B. The terminal device includes a storage module 560, a receiving module 570, a processing module 580, and a sending module 590. It should be noted that these modules are logic modules whose functions are relatively independent, and may be generated after a CPU in the terminal device reads and runs software code in a memory, or may be implemented by using a hardware component.

Specifically; the storage module 560 is configured to store a first correspondence table and a second correspondence table. The first correspondence table stores a correspondence between an identifier of a process running on the terminal device and an identifier of a data stream created by the process. The second correspondence table stores a second correspondence between an identifier of an application and an identifier of a process created by the application. The identifier of the data stream is a 5-tuple including a source address, a source port, a destination address, a destination port, and a protocol identifier.

The receiving module 570 is configured to receive an identifier, sent by a network security device, of a first data stream.

The processing module 580 is configured to: find, in the first correspondence table stored in the storage module 560, a first record in which the identifier of the first data stream is stored, to obtain an identifier of a process in the first record; and find, in the second correspondence table, a second record in which the identifier of the process in the first record is stored, to obtain an identifier of an application from the second record.

The sending module 590 is configured to send the identifier of the application to the network security device.

Optionally, the processing module 580 may obtain the first correspondence table and update the first correspondence table by using the method according to FIG. 3A and FIG. 3B and related description.

Optionally, the processing module 580 may obtain packets of a complete data stream by using the method according to FIG. 4A and FIG. 4B and related description.

The terminal device provided in FIG. 5A and FIG. 5B may be used as the terminal device 110 in FIG. 1A or FIG. 1B.

After receiving the identifier, sent by the network security device, of the data stream, the terminal device provided in this embodiment of this application finds the identifier of the application according to the first correspondence table and the second correspondence table that are stored by the terminal device, and sends the found identifier of the application to the network security device. More applications can be identified by means of interaction between the network security device and the terminal device, so that a proportion of unidentified traffic in total traffic is reduced, and an effect of identifying network traffic is improved.

Figure 6A:
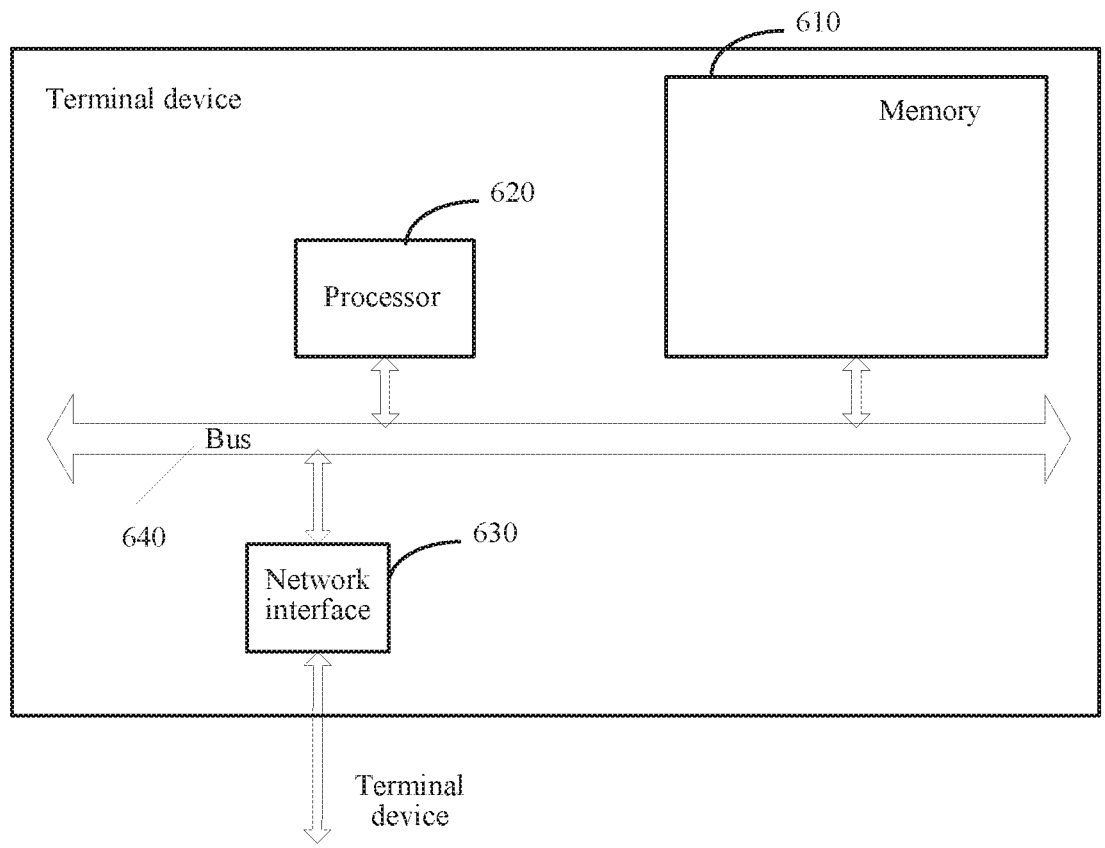
FIG. 6A is a schematic structural diagram of a network security device according to an embodiment of this application.

An embodiment of this application further provides a network security device. As shown in FIG. 6A, the network security device includes a memory 610, a processor 620, and a network interface 630, and the memory 610, the processor 620, and the network interface 630 communicate with each other by using a bus 640.

The memory 610 includes but is not limited to a RAM, a ROM, an EPROM or a flash memory, or a portable read-only memory (CD-ROM).

The processor 620 may be one or more CPU. When the processor 620 is one CPU, the CPU may be a single-core CPU, or may be a multi-core CPU.

The network interface 630 may be a wired interface, for example, a FDDI or a GE interface; or the network interface 630 may be a wireless interface.

The network interface 630 is configured to receive a first data stream.

The processor 620 is configured to obtain an identifier of the first data stream. The identifier of the data stream is a 5-tuple including a source address, a source port, a destination address, a destination port, and a protocol identifier.

The network interface 630 is further configured to send the identifier of the data stream to the terminal device according to the source address or the destination address in the identifier of the first data stream, where an address of the terminal device is the source address or the destination address in the identifier of the first data stream.

Optionally, the processor 620 instructs, when an application sending the first data stream cannot be identified by using an existing application identification technology, the network interface 630 to send the identifier of the data stream to the terminal device.

The network interface 630 is further configured to receive an identifier of an application sent by the terminal device.

The processor 620 is further configured to determine that the identifier of the application received by the network interface 630 is the identifier of the application sending the first data stream, so as to obtain an application identification result of the first data stream.

Figure 6B:
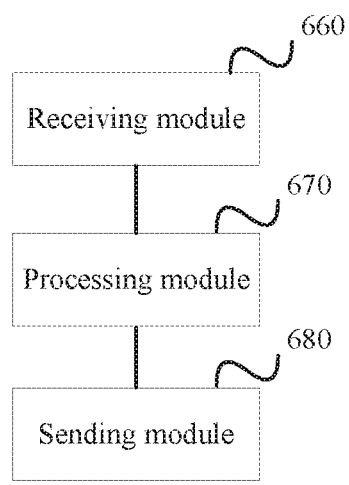
FIG. 6B is a schematic structural diagram of another network security device according to an embodiment of this application.

An embodiment of this application further provides a network security device, as shown in FIG. 6B. The network security device includes a receiving module 660, a processing module 670, and a sending module 680. It should be noted that these modules are logic modules whose functions are relatively independent, and may be generated after a CPU in a terminal device reads and runs software code in a memory, or may be implemented by using a hardware component. Specifically:

The receiving module 660 is configured to receive a first data stream.

The processing module 670 is configured to obtain an identifier of the first data stream. The identifier of the data stream is a 5-tuple including a source address, a source port, a destination address, a destination port, and a protocol identifier.

The sending module 680 is configured to send the identifier of the data stream to the terminal device according to the source address or the destination address in the identifier of the first data stream, where an address of the terminal device is the source address or the destination address in the identifier of the first data stream.

Optionally, the processing module 670 instructs, when an application sending the first data stream cannot be identified by using an existing application identification technology, the sending module 680 to send the identifier of the data stream to the terminal device.

The receiving module 660 is further configured to receive an identifier of an application sent by the terminal device.

The processing module 670 is further configured to determine that the identifier of the application received by the receiving module 660 is the identifier of the application sending the first data stream, so as to obtain an application identification result of the first data stream.

The network security device provided in FIG. 6A and FIG. 6B may be used as the network security device 120 in FIG. 1A or FIG. 1B. For a process of interaction between the network security device provided in FIG. 6A and FIG. 6B and the terminal device, refer to FIG. 2A and FIG. 2B and related description.

The network security device provided in this embodiment of this application sends, when the application sending the data stream cannot be identified by using the existing application identification technology, the identifier of the data stream to the terminal device; receives the identifier of the application sent by the terminal device; and uses the received identifier of the application as the identifier of the application sending the data stream, so as to obtain the application identification result of the data stream. More applications can be identified by means of interaction between the network security device and the terminal device, so that a proportion of unidentified traffic in total traffic is reduced, and an effect of identifying network traffic is improved.

Embodiment 2

Figure 7:
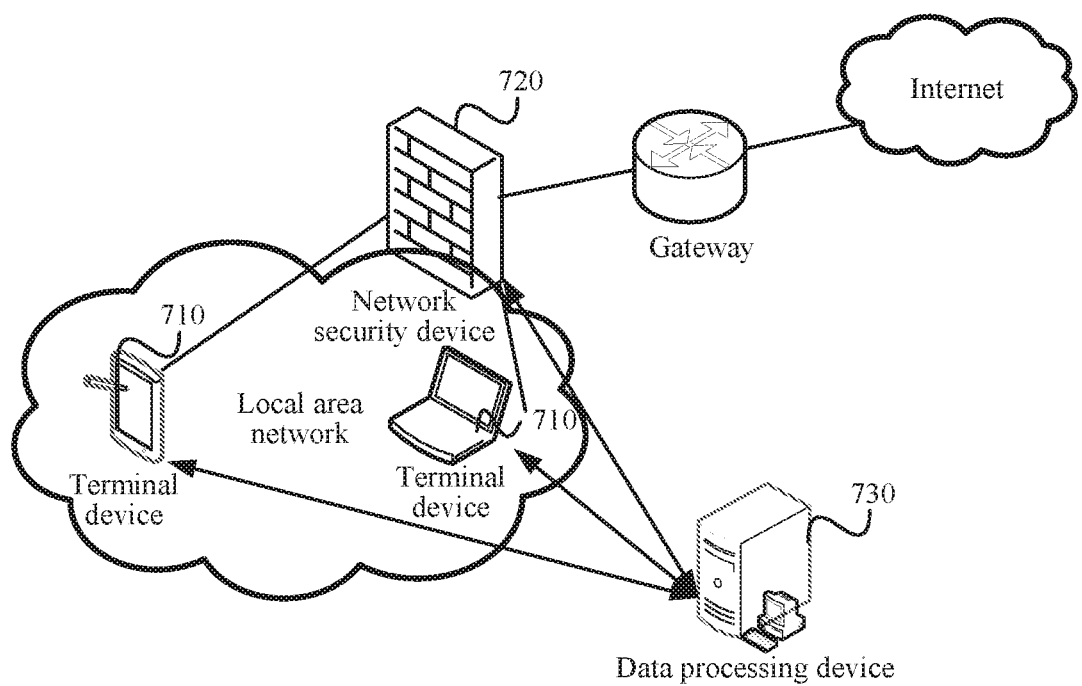
FIG. 7 is a schematic diagram of another system for identifying application information in network traffic according to an embodiment of this application.

FIG. 7 is a schematic diagram of a system for identifying application information in network traffic according to an embodiment of this application. The system includes a terminal device 710, a network security device 720, and a data processing device 730. Compared with the identification system shown in FIG. 1A and FIG. 1B, the system shown in FIG. 7 is added with the data processing device 730. The data processing device 730 may be used as a logic module and integrated in the network security device 720 or the terminal device 710, or may be deployed separately as an independent physical device provided that separate communication with the terminal device 710 and the network security device 720 can be ensured.

In the prior art, to implement an objective of finding an incorrect identification result of a network security device, only unmixed traffic that only includes traffic generated by an application to be identified and that does not include traffic generated by another application can be used to test an effect of identifying, by the network security device, the application to be identified. Moreover, an identification effect in a case of mixed traffic cannot be estimated.

A main objective of adding the data processing device 730 in this embodiment is to identify an incorrect identification result of the network security device 720 by comprehensively analyzing information from the terminal device 710 and information from the network security device 720.

First, it should be noted that the terminal device 710 has particular similarity to the terminal device 110 in Embodiment 1, and the network security device 720 has particular similarity to the network security device 120 in Embodiment 1. For brevity, a difference from Embodiment 1 is emphatically described in detail in this embodiment, and content that is similar to content in Embodiment 1 is briefly described.

In the identification system shown in FIG. 7, the network security device 720 is configured to: receive a first data stream; generate a first identification record after determining an identifier of an application sending the first data stream, where the first identification record includes an identifier of the first data stream and the identifier of the application, and the identifier of the data stream is a 5-tuple including a source address, a source port, a destination address, a destination port, and a protocol identifier; and send the first identification record to the data processing device. The network security device 720 may identify the first data stream by using an existing application identification technology such as a feature-based identification technology, a heuristic identification technology, or an association identification technology, so as to determine the identifier of the application sending the first data stream.

The terminal device 710 is configured to: obtain an identifier of a process running on the terminal device and an identifier of a second data stream created by the process, to generate a second identification record, where the second identification record includes the identifier of the second data stream and the identifier of the process; obtain a correspondence table, where each record in the correspondence table stores an identifier of an application and an identifier of a process created by the application; and send the second identification record and the correspondence table to the data processing device. It is readily understood that the correspondence table in this embodiment is the second correspondence table in Embodiment 1. To keep consistent with a name of each correspondence table in Embodiment 1, a name of the second correspondence table is still retained in this embodiment.

The second identification record in this embodiment may be a record in the first correspondence table in Embodiment 1. For a process of obtaining the first correspondence table by the terminal device 710, refer to related content in Embodiment 1. After obtaining the first correspondence table, the terminal device 710 integrally sends the first correspondence table as a file to the data processing device 730, or selectively sends one record or multiple records in the first correspondence table to the data processing device 730. This is not limited herein.

The data processing device 730 is configured to receive the first identification record from the network security device 720, and receive the second identification record and the correspondence table from the terminal device 710; if the identifier of the first data stream included in the first identification record is the same as the identifier of the second data stream included in the second identification record, query whether a first association record exists in the correspondence table, where the first association record stores the identifier of the application included in the first identification record and the identifier of the process included in the second identification record; and if the first association record does not exist, determine that the first identification record is an incorrect identification record.

Optionally, after determining that the first identification record is the incorrect identification record, the data processing device 730 may further send the identifier of the process included in the second identification record to the terminal device 710, so that the terminal device 710 sets a packet capture flag for the identifier of the process, and subsequently captures multiple complete data streams sent by the process represented by the identifier of the process to perform manual analysis. For a detailed packet capture process, refer to FIG. 4A and FIG. 4B in Embodiment 1 and related description. Details are not described herein again.

Optionally, to reduce occupation of a transmission resource between the data processing device and the network security device caused due to that the network security device subsequently sends a same incorrect identification record repeatedly to the data processing device because of a same association identification rule, the network security device may add an identifier of an identification manner to the first identification record sent to the data processing device. After determining that the incorrect identification record is caused by the association identification rule, the data processing device instructs the network security device to delete a related association identification rule. Therefore, an incorrect identification record subsequently caused by a same reason is avoided.

Specifically; the first identification record from the network security device 720 further includes the identifier of the identification manner, where the identification manner includes association identification, feature identification, and heuristic identification.

The association identification manner means that the network security device 720 identifies, according to correspondences between an IP address and a port number of a packet and the application, an application sending the packet. For example, the network security device 720 may obtain, by parsing a control packet on an FTP control channel, an IP address and a port number that are used by a to-be-created data channel, and add correspondences between the obtained IP address and port number, and a name of an FTP client, such as FileZilla, to an association table. After receiving a subsequent packet, the network security device 720 queries whether an IP address and a port number carried in the packet exist in the association table; and if the IP address and the port number carried in the packet exist in the association table, uses FileZilla corresponding to the IP address and the port number that are carried in the packet and that are in the association table as an application sending the packet.

When the first identification record further includes the identifier of the identification manner, after determining that the first identification record is an incorrect identification record, the data processing device 730 may further send a notification message to the network security device if the identifier of the identification manner in the first identification record is an identifier of the association identification manner. The notification message is used to instruct the network security device to delete a first association identification rule, and the first association identification rule includes the identifier of the first data stream included in the first identification record.

In the system for identifying application information in network traffic provided in this embodiment of this application, the data processing device receives the first identification record from the network security device, and the second identification record and the correspondence table from the terminal device; if the identifier of the first data stream included in the first identification record is the same as the identifier of the second data stream included in the second identification record, queries whether a first association record exists in the correspondence table, where the first association record stores the identifier of the application included in the first identification record and the identifier of the process included in the second identification record; and if the first association record does not exist, determines that the first identification record is an incorrect identification record. The data processing device can identify, by comparing an identification record of the terminal device with that of the network security device, an incorrect identification record that is of the network security device and that is difficult to find by using the prior art. Therefore, an effect of identifying network traffic is improved.

The following describes, by referring to FIG. 8A-1 to FIG. 8A-3 and FIG. 8B-1 and FIG. 8B-2 and with reference to a specific example, a method for identifying application information in network traffic provided in an embodiment. In this embodiment, a terminal device may be the terminal device 710 in FIG. 7, a network security device may be the network security device 720 in FIG. 7, and a data processing device may be the data processing device 730 in FIG. 7.

Figures 1, 8A:
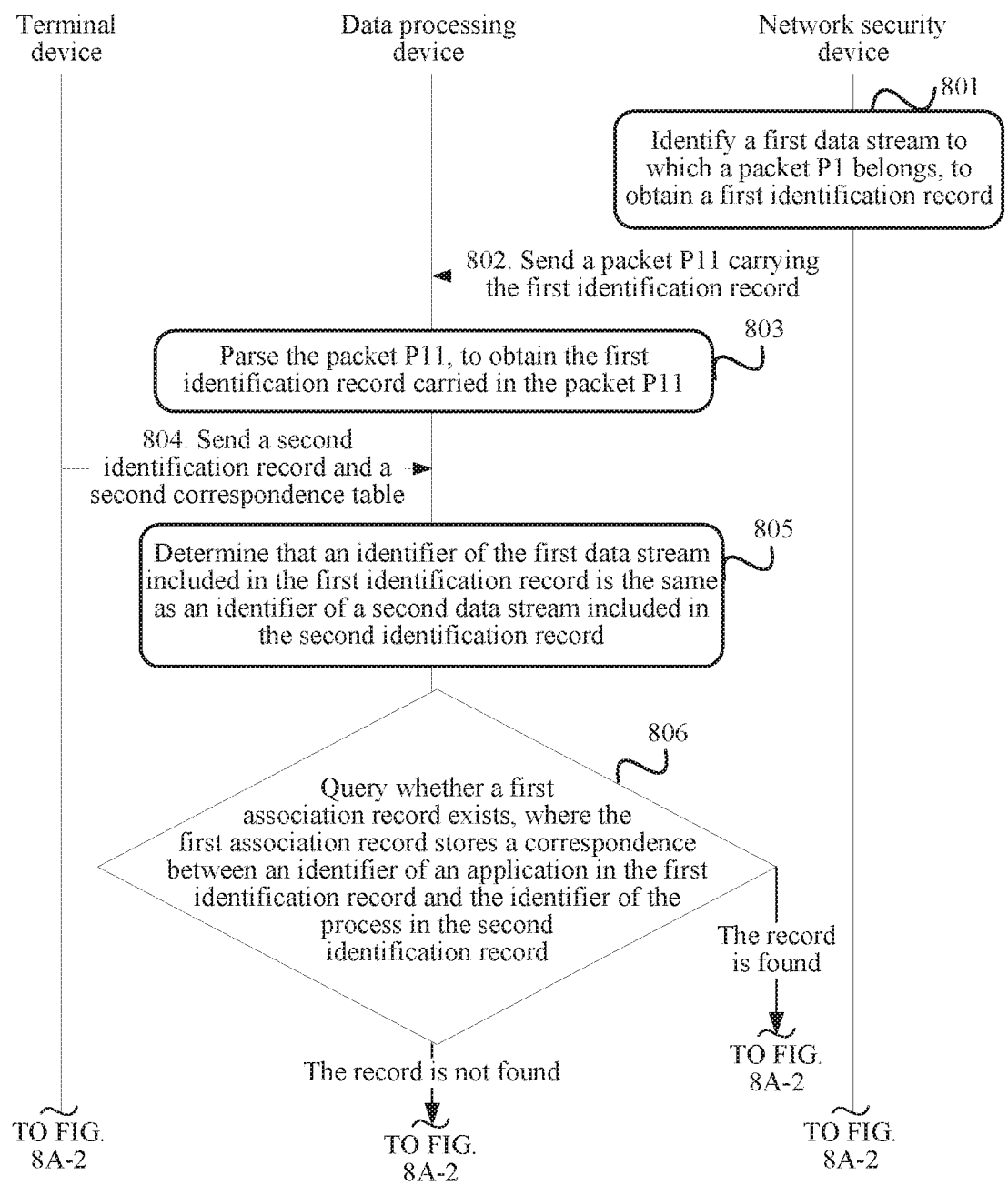
Figures 2, 8A:
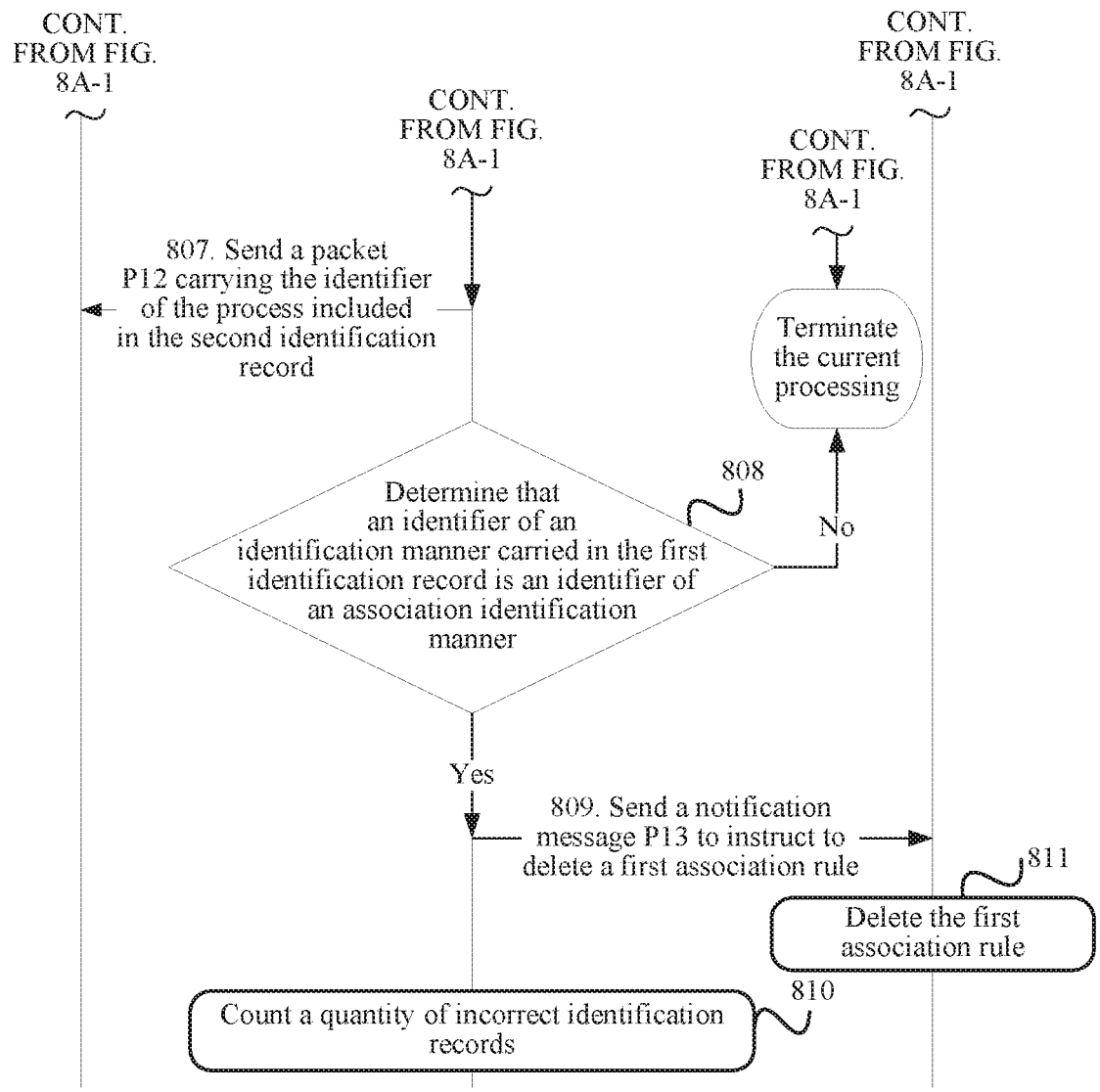
Figures 3, 8A:
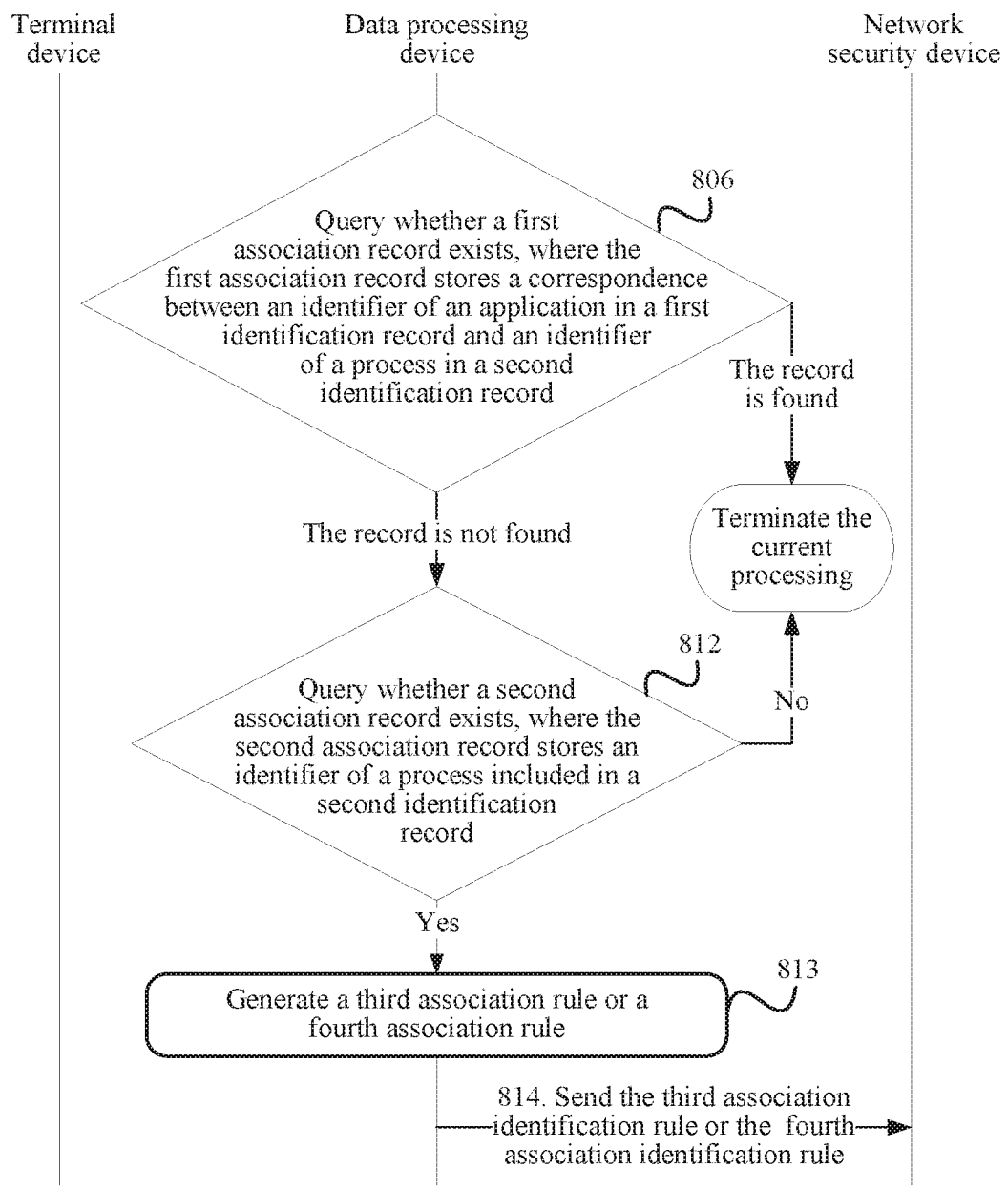

In FIG. 8A-1 to FIG. 8A-3, the identification method provided in this embodiment is described in a manner of a detailed time sequence interaction diagram.

Step 801: After receiving a packet P10 of a first data stream, the network security device performs, based on an association identification technology, application identification on the first data stream, to obtain an identification result, that is, a first identification record "tcp 192.168.1.211:3020-201.6.8.30:6682 Storm Codec A".

The first identification record may be obtained after the network security device receives the first data stream and then identifies the first data stream by using a rule obtained by using a feature-based identification technology, a heuristic identification technology, or an association identification technology. The network security device may use various existing identification technologies successively to identify the packet until an identification result can be obtained. For example, the network security device first uses a feature-based rule to identify the packet; when no identification result can be obtained, that is, a feature in the packet is inconsistent with any feature in the feature-based rule, uses a heuristic rule to identify the packet; and when no identification result can be obtained, then uses an association identification rule to attempt to identify the packet. Certainly, if the identification result can be obtained when the network security device first uses the feature-based rule to identify the packet, an identification record is generated, and processing ends. A sequence of selecting identification technologies by the network security device is not particularly limited.

In this embodiment, the first identification record is identified by the network security device according to a first association identification rule, and the first association identification rule is "tcp 201.6.8.30:6682 Storm Codec". After receiving the packet P10, the network security device obtains a destination 3-tuple and a source 3-tuple from the packet, matches the destination 3-tuple or the source 3-tuple with the first association identification rule, and if either of the destination 3-tuple and the source 3-tuple is consistent with a 3-tuple in the first association identification rule, determines that the first data stream to which the packet P10 belongs is sent by Storm Codec in the terminal device.

In this embodiment, an identifier of an association identification manner is A, an identifier of a feature-based identification manner is B. and an identifier of a heuristic identification manner is C.

Step 802: The network security device adds the first identification record "tcp 192.168.1.211:3020-201.6.8.30:6682 Storm Codec A" to a packet P11, and sends the P11 to the data processing device.

Step 803: After receiving the packet P11, the data processing device parses the packet P11, to obtain the first identification record "tcp 192.168.1.211:3020-201.6.8.30:6682 Storm Codec A" carried in the packet P11.

Step 804: The data processing device receives a second identification record "tcp 192.168.1.211:3020-201.6.8.30:6682 SogouCloud.exe" and a second correspondence table from the terminal device.

It should be noted that the second identification record and the second correspondence table may be sent separately. For example, the second correspondence table is sent after initialization of the agent in the terminal device is completed, or sent after the agent in the terminal device detects that the second correspondence table shown in Table 2 in Embodiment 1 changes.

If the terminal device is configured to regularly send the maintained first correspondence table shown in Table 1 in Embodiment 1 as an integral file package to the data processing device, the second identification record may be a record in the first correspondence table sent by the terminal device.

Alternatively, after receiving the first identification record from the network security device, the data processing device may extract a 5-tuple from the first identification record, and send the 5-tuple to the terminal device, to instruct the terminal device to return a record that includes the 5-tuple and that is in the first correspondence table to the data processing device.

A specific manner in which the terminal device sends the second identification record to the data processing device is not limited herein.

Step 805: The data processing device determines that the identifier of the first data stream included in the first identification record is the same as an identifier of a second data stream included in the second identification record.

Specifically, if the terminal device is configured to regularly send the maintained first correspondence table shown in Table 1 in Embodiment 1 as an integral file package to the data processing device, the data processing device finds, in the integral file package according to the 5-tuple in the first identification record, a record including a 5-tuple "tcp 192.168.1.211:3020-201.6.8.30:6682" as the second identification record.

If the terminal device independently sends the second identification record, after receiving the first identification record sent by the network security device, the data processing device compares the first identification record with at least one identification record that is previously received from the terminal device within a preset time segment; determines that an identification record that carries a data stream whose identifier is the same as an identifier of a data stream included in the first identification record exists; and uses the identification record as the second identification record.

Step 806: The data processing device queries whether a first association record exists in the second correspondence table, where the first association record stores an identifier of an application included in the first identification record and an identifier of a process included in the second identification record.

If the first association record exists, it indicates that the first identification record is a correct identification record, and the data processing device continues to process a next identification record sent by the network security device; or if the first association record does not exist, it indicates that the first identification record is an incorrect identification record.

Specifically, the data processing device determines whether an association record exists in the second correspondence table, where the association record stores the identifier "Storm Codec" of the application in the first identification record and the identifier "SogouCloud.exe" of the process in the second identification record. In this embodiment, a record that includes both "Storm Codec" and "SogouCloud.exe" does not exist in the second association table shown in Table 2.

If the data processing device determines that an identification record from the network security device is an incorrect identification record, at least one of step 807, step 810, or a sub-procedure including step 808 to step 809 may be performed. In other words, step 807, step 810, or the sub-procedure including step 808 to step 809 is optional, and is not particularly limited in an execution sequence.

Step 807: The data processing device sends, to the terminal device, a packet P12 carrying the identifier "SogouCloud.exe" of the process included in the second identification record, so that the terminal device sets a packet capture flag for the identifier of the process, and subsequently captures multiple complete data streams sent by the process represented by the identifier of the process to perform manual analysis. For a detailed packet capture process, refer to description in step 49 to step 422 in FIG. 4A and FIG. 4B.

Step 808: The data processing device determines whether an identifier of an identification manner carried in the first identification record is an identifier of an association identification manner; and if the identifier of the identification manner carried in the first identification record is the identifier of the association identification manner, performs step 809: or if the identifier of the identification manner carried in the first identification record is not the identifier of the association identification manner, ends the current processing.

Step 809: The data processing device sends a notification message P13 to the network security device, where the notification message is used to instruct the network security device to delete a first association identification rule "tcp 201.6.8.30:6682 Storm Codec".

Specifically, the notification message may carry the identifier of the data stream included in the first identification record and a delete instruction, for example, "201.6.8.30: 6682 D", and D is the delete instruction.

Step 810: The data processing device further counts a quantity of incorrect identification records, and increases a current quantity of incorrect identification records by 1 each time after an incorrect identification record is determined.

Optionally, when determining that the first identification record is a correct identification record in step 806, the data processing device may also increase a current quantity of correct identification records by 1. In this way, a false reporting rate in the preset time segment may be calculated according to a quantity of incorrect identification records and a quantity of correct identification records.

The data processing device may further regularly output the incorrect identification records and the false reporting rate by using an output interface, for example, a display or a printer, for analysis by management personnel.

Step 811: After receiving the notification message P13, the network security device deletes the first association identification rule "tcp 201.6.8.30:6682 Storm Codec" or a second association identification rule "tcp 192.168.1.211: 3020 Storm Codec".

Optionally, in step 806, after determining that the first identification record is an incorrect identification record, the data processing device further generates a correct association identification rule for the network security device, so as to improve a subsequent identification effect of the network security device. Specifically:

Step 812: The data processing device queries whether a second association record exists in the correspondence table, where the second association record stores the identifier of the process included in the second identification record. If the second association record exists, step 813 is performed. If the second association record does not exist, processing ends.

Step 813: The data processing device generates a third association identification rule or a fourth association identification rule, where the third association identification rule includes an identifier of an application in the second association record, and a 3-tuple including a destination address, a destination port, and a protocol identifier of the first data stream, and the fourth association identification rule includes the identifier of the application in the second association record, and a 3-tuple including a source address, a source port, and the protocol identifier of the first data stream.

In this example, a record in a first row in the second correspondence table shown in Table 2 includes "SogouCloud.exe", and an identifier of an application included in the record in the first row is "Sogou input method".

The generated third association identification rule is "tcp 201.6.8.30:6682 Sogou input method", and the generated fourth association identification rule is "tcp 192.168.1.211: 3020 Sogou input method".

Step 814: The data processing device sends the third association identification rule or the fourth association identification rule to the network security device.

Figures 1, 8B:
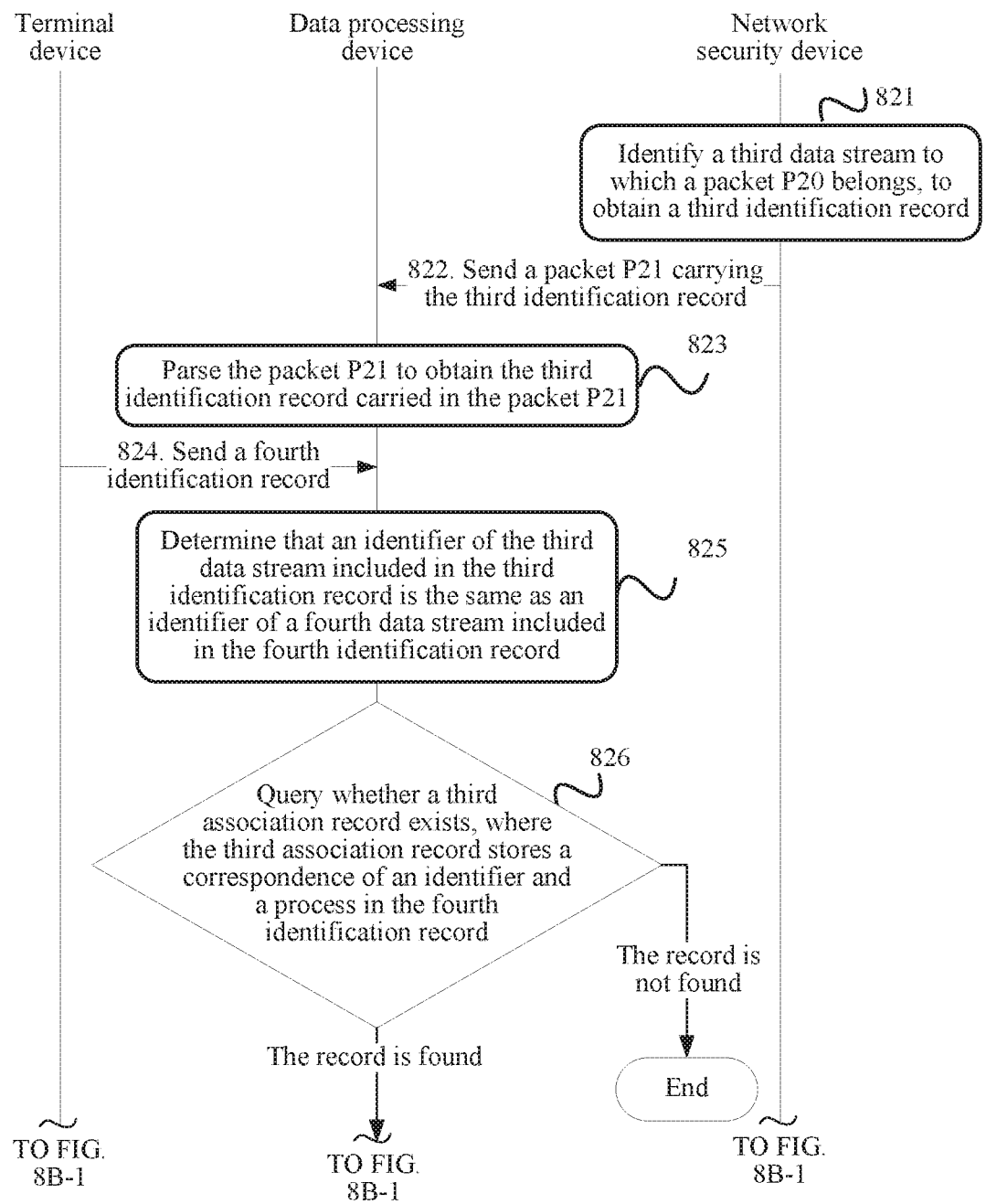
Figures 2, 8B:
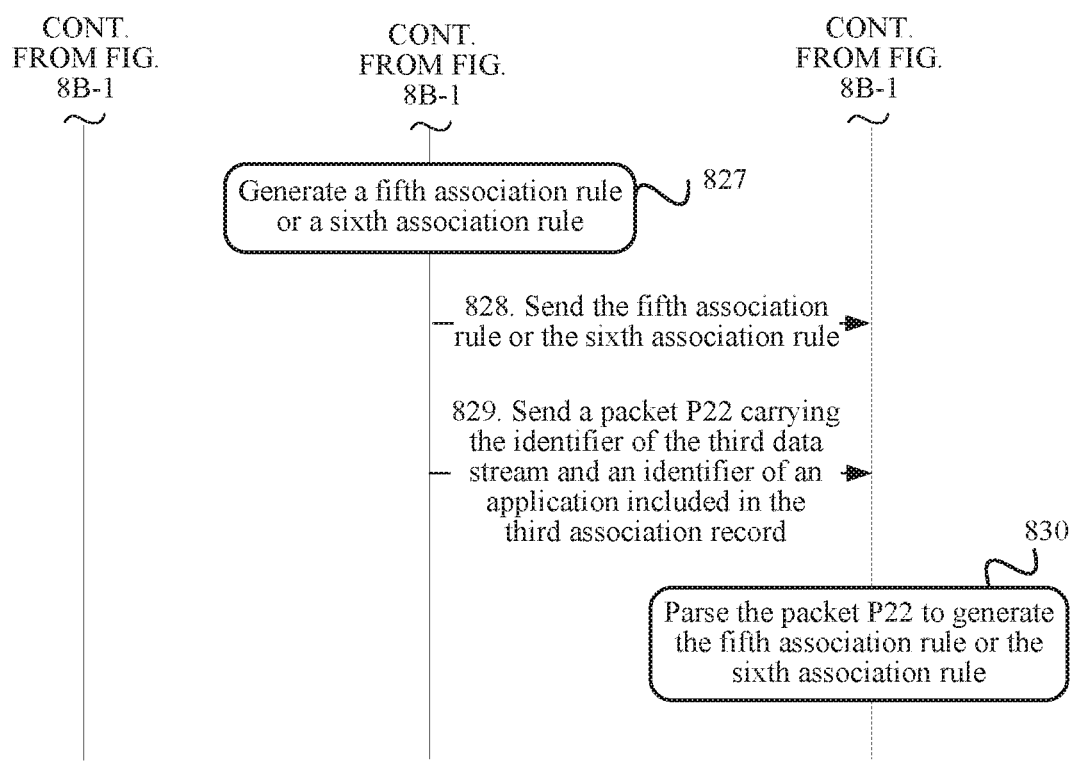

FIG. 8B-1 and FIG. 8B-2 show another flowchart of an identification method executed by a data processing device. It should be understood that, based on FIG. 8A-1 to FIG. 8A-3, step 821 to step 829 in FIG. 8B-1 and FIG. 8B-2 are description given for another two identification records sent by the network security device and the terminal device.

Step 821: After receiving a packet P20 of a third data stream, the network security device performs application identification on the third data stream based on an existing feature-based identification technology, and if no identification result can be obtained, generates a third identification record "tcp 192.168.1.211:6120-168.3.56.120:1138 Unidentified", where Unidentified is an unidentified flag and is used to indicate that the network security device has not identified an application sending the third data stream.

Step 822: The network security device adds the third identification record "tcp 192.168.1.211:6120-168.3.56.120: 1138 Unidentified" to a packet P21, and sends the P21 to the data processing device.

Step 823: After receiving the packet P21, the data processing device obtains the carried third identification record "tcp 192.168.1.211:6120-168.3.56.120:1138 Unidentified" from the packet P21.

Step 824: The data processing device receives a fourth identification record "tcp 192.168.1.211:6120-168.3.56.120: 1138 kxescore.exe" from the terminal device.

Herein, it is assumed that the second correspondence table shown in Table 2 is already stored in the data processing device.

Step 825: The data processing device determines that an identifier of the third data stream included in the third identification record is the same as an identifier of a fourth data stream included in the fourth identification record.

Step 826: The data processing device queries whether a third association record exists in the second correspondence table, where the third association record stores an identifier of a process included in the fourth identification record.

If the third association record exists, either of a sub-procedure including step 827 to step 828 and a sub-procedure including step 829 to step 830 may be selected for execution.

In this embodiment, a third record in Table 2 is "kxescore.exe".

Step 827: The data processing device generates a fifth association identification rule or a sixth association identification rule, where the fifth association identification rule includes an identifier of an application included in a third association record, and a 3-tuple including a destination address, a destination port, and a protocol identifier of the third data stream, and the sixth association identification rule includes an identifier of an application included in the third association record, and a 3-tuple including a source address, a source port, and the protocol identifier of the third data stream.

In this embodiment, the fifth association identification rule is "tcp 168.3.56.120:1138 Huawei Security Guard", and the sixth association identification rule is "tcp 192.168.1.211:6120 Huawei Security Guard".

Step 828: The data processing device sends the fifth association identification rule or the sixth association identification rule to the network security device.

Step 829: The data processing device adds the identifier of the third data stream and the identifier of the application included in the third association record to a packet 22, and sends the packet P22 to the network security device.

Step 830: After receiving the packet P22, the network security device generates the fifth association identification rule or the sixth association identification rule according to the packet P22.

The fifth association identification rule includes the identifier of the application carried in the packet P22, and a 3-tuple that includes the destination address, the destination port, and the protocol identifier of the third data stream and that is carried in the packet P22. The sixth association identification rule includes the identifier of the application carried in the packet P22, and the 3-tuple including the source address, the source port, and the protocol identifier of the third data stream.

It should be noted herein that, in a manner of generating a new association identification rule according to an identification record, as shown in step 212 in FIG. 2A and FIG. 2B in Embodiment 1, step 813 in FIG. 8A-1 to FIG. 8A-3 in Embodiment 2, and step 827 to step 828, or step 829 to step 830 in FIG. 8B-1 and FIG. 8B-2 in Embodiment 2, in order to reduce, in specific implementation, a probability of incorrect identification subsequently generated due to an association identification rule, an association identification rule may be generated according to multiple identification records having a particular similarity, instead of generating the association identification rule immediately after one identification record is obtained.

For example, when determining a correct identification record in step 826, the data processing device generates and stores a temporary association identification rule, and sets a count value for each temporary association identification rule, as shown in Table 8.

TABLE 8

| Serial number | Temporary association identification rule | Count value |
|---|---|---|
| 1 | tcp 168.3.56.120:1138 Huawei Security Guard | 1 |
| 2 | tcp 192.168.1.211:6120 Huawei Security Guard | 1 |
| 3 | | |

When the data processing device subsequently performs the procedure shown in FIG. 8B-1 and FIG. 8B-2 again to generate another temporary association identification rule, and stores the temporary association identification rule in Table 8, the data processing device first queries whether a same temporary association identification rule exists in Table 8; and if the same temporary association identification rule exists, increases a count value corresponding to the temporary association identification rule by 1; or if the same temporary association identification rule does not exist, adds a new record to Table 8, and sets a count value to 1.

The data processing device sets a threshold, for example, 10. When a count value of a record in Table 8 exceeds the threshold, it indicates that the temporary association identification rule has universality, and the temporary association identification rule is then used as a formal association identification rule that can be used by the network security device to perform application identification on a subsequently received data stream.

In the method for identifying application information in network traffic provided in this embodiment of this application, the data processing device receives the first identification record from the network security device, and the second identification record and the correspondence table from the terminal device; if the identifier of the first data stream included in the first identification record is the same as the identifier of the second data stream included in the second identification record, queries whether an association record exists in the correspondence table, where the association record stores the identifier of the application included in the first identification record and the identifier of the process included in the second identification record; and if the association record does not exist, determines that the first identification record is an incorrect identification record. According to the foregoing process, the incorrect identification record of the network security device can be found, and an application identification effect can be improved.

Figure 9A:
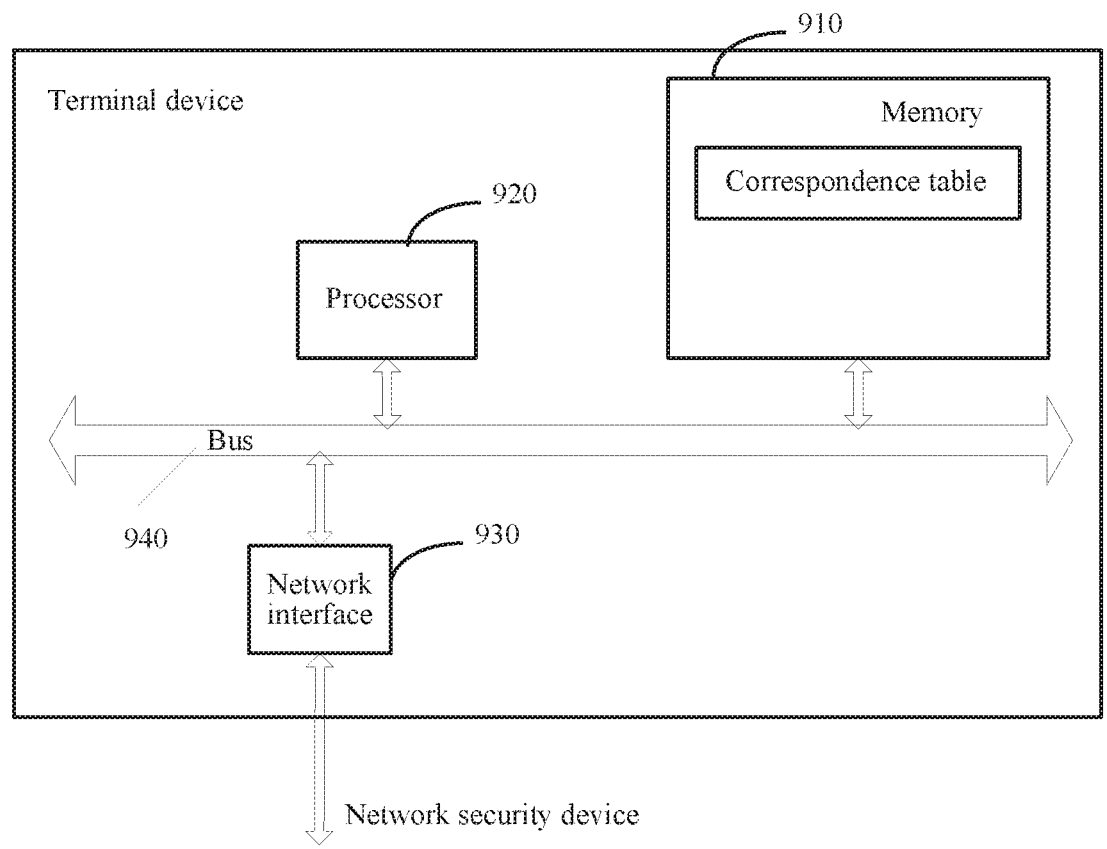
FIG. 9A is a schematic structural diagram of a data processing device according to an embodiment of this application.

An embodiment of this application further provides a data processing device, as shown in FIG. 9A. The data processing device includes a memory 910, a processor 920, and a network interface 930, and the memory 910, the processor 920, and the network interface 930 communicate with each other by using a bus 940.

The memory 910 includes but is not limited to a RAM, a ROM, an EPROM or a flash memory, or a portable read-only memory (CD-ROM).

The processor 920 may be one or more CPU. When the processor 920 is one CPU, the CPU may be a single-core CPU, or may be a multi-core CPU.

The network interface 930 may be a wired interface, for example, a FDDI or a GE interface; or the network interface 930 may be a wireless interface.

The network interface 930 is configured to receive a first identification record from a network security device, where the first identification record includes an identifier of a first data stream and an identifier of an application; and receive a second identification record and a correspondence table from a terminal device, where the second identification record includes an identifier of a second data stream and an identifier of a process, and each record in the correspondence table stores an identifier of an application and an identifier of a process created by the application.

The processor 920 reads program code stored in the memory 910, to perform the following steps:

if the identifier of the first data stream included in the first identification record is the same as the identifier of the second data stream included in the second identification record, querying whether a first association record exists in the correspondence table, where the first association record stores the identifier of the application included in the first identification record and the identifier of the process included in the second identification record; and if the first association record does not exist, determining that the first identification record is an incorrect identification record.

Optionally, the network interface 930 is further configured to: if an identifier of an identification manner in the first identification record is an identifier of an association identification manner, when the first association record does not exist, send a notification message to the network security device, where the notification message is used to instruct the network security device to delete a first association identification rule or a second association identification rule, the first association identification rule includes a 3-tuple including a destination address, a destination port, and a protocol identifier of the first data stream, and the second association identification rule includes a 3-tuple including a source address, a source port, and the protocol identifier of the first data stream.

The data processing device may further interact with the network security device and the terminal device, to identify traffic that cannot be identified in the prior art. Optionally, the network interface 930 is further configured to: receive a third identification record from the network security device, where the third identification record includes an identifier of a third data stream and an unidentified flag, and the unidentified flag is used to indicate that the network security device has not identified an application sending the third data stream; and receive a fourth identification record from the terminal device, where the fourth identification record includes an identifier of a fourth data stream and an identifier of a process.

The processor 920 is further configured to: determine whether the identifier of the third data stream included in the third identification record is the same as the identifier of the fourth data stream included in the fourth identification record; and if the identifier of the third data stream included in the third identification record is the same as the identifier of the fourth data stream included in the fourth identification record, query whether a third association record exists in the correspondence table, where the third association record stores the identifier of the process included in the fourth identification record.

The network interface 930 is further configured to: if the processor determines that the third association record exists, send an identifier of an application included in the third association record and the identifier of the third data stream to the network security device.

Figure 9B:
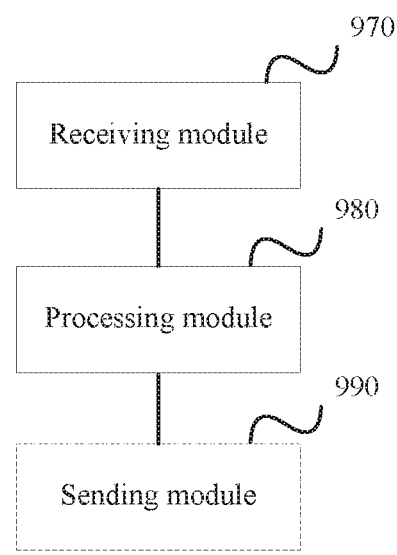
FIG. 9B is a schematic structural diagram of another data processing device according to an embodiment of this application.

An embodiment of this application further provides a data processing device, as shown in FIG. 9B. The data processing device includes a receiving module 970 and a processing module 980. It should be noted that these modules are logic modules whose functions are relatively independent, and may be generated after a CPU in the data processing device reads and runs software code in a memory, or may be implemented by using a hardware component.

Specifically:

The receiving module 970 is configured to receive a first identification record from a network security device, where the first identification record includes an identifier of a first data stream and an identifier of an application; and receive a second identification record and a correspondence table from a terminal device, where the second identification record includes an identifier of a second data stream and an identifier of a process, and each record in the correspondence table stores an identifier of an application and an identifier of a process created by the application.

The processing module 980 is configured to: if the identifier of the first data stream included in the first identification record received by the receiving module 970 is the same as the identifier of the second data stream included in the second identification record received by the receiving module 970, query whether a first association record exists in the correspondence table, where the first association record stores the identifier of the application included in the first identification record and the identifier of the process included in the second identification record; and if the first association record does not exist, determine that the first identification record is an incorrect identification record.

Optionally, the data processing device shown in FIG. 9B further includes a sending module 990, configured to: if an identifier of an identification manner in the first identification record is an identifier of an association identification manner, when the first association record does not exist, send a notification message to the network security device, where the notification message is used to instruct the network security device to delete a first association identification rule or a second association identification rule, the first association identification rule includes a 3-tuple including a destination address, a destination port, and a protocol identifier of the first data stream, and the second association identification rule includes a 3-tuple including a source address, a source port, and the protocol identifier of the first data stream.

The data processing device may further interact with the network security device and the terminal device, to identify traffic that cannot be identified in the prior art. Optionally, the receiving module 970 is further configured to: receive a third identification record from the network security device, where the third identification record includes an identifier of a third data stream and an unidentified flag, and the unidentified flag is used to indicate that the network security device has not identified an application sending the third data stream; and receive a fourth identification record from the terminal device, where the fourth identification record includes an identifier of a fourth data stream and an identifier of a process.

The processing module 980 is further configured to: determine whether the identifier of the third data stream included in the third identification record is the same as the identifier of the fourth data stream included in the fourth identification record; and if the identifier of the third data stream included in the third identification record is the same as the identifier of the fourth data stream included in the fourth identification record, query whether a third association record exists in the correspondence table, where the third association record stores the identifier of the process included in the fourth identification record.

The sending module 990 is further configured to: if the processing module 980 determines that the third association record exists, send an identifier of an application included in the third association record and the identifier of the third data stream to the network security device.

The data processing device provided in FIGS. 9A and 9B may be used as the data processing device 730 in FIG. 7.

For other additional functions of the data processing device and a detailed process of interaction between the network security device and the terminal device, refer to FIG. 8A-1 to FIG. 8A-3 and FIG. 8B-1 and FIG. 8B-2, and related description. Details are not described herein again.

The data processing device provided in this embodiment of this application receives the first identification record from the network security device, and the second identification record and the correspondence table from the terminal device; if the identifier of the first data stream included in the first identification record is the same as the identifier of the second data stream included in the second identification record, queries whether an association record exists in the correspondence table, where the association record stores the identifier of the application included in the first identification record and the identifier of the process included in the second identification record; and if the association record does not exist, determines that the first identification record is an incorrect identification record. According to the foregoing process, the incorrect identification record of the network security device can be found, and an application identification effect can be improved.

Obviously, a person skilled in the art can make various modifications and variations to the present invention without departing from the spirit and scope of the present invention. Therefore, the present invention shall be construed to include these modifications and variations, provided that these modifications and variations fall within the scope of the claims and equivalent technologies of the present invention.

What is claimed is:

1. A method for identifying application information in network traffic, the method comprising:
   receiving, by a data processing device, a first identification record from a network security device, wherein the first identification record comprises an identifier of a first data stream and an identifier of an application, and wherein the identifier of the first data stream is a 5-tuple comprising a source address, a source port, a destination address, a destination port, and a protocol identifier;
   receiving, by the data processing device, a second identification record and a correspondence table from a terminal device, wherein the second identification record comprises an identifier of a second data stream and an identifier of a process, and wherein each entry in the correspondence table stores an identifier of an application and an identifier of a process created by the application;
   determining, by the data processing device, whether the identifier of the first data stream comprised in the first identification record is the same as the identifier of the second data stream comprised in the second identification record;
   in response to determining that the identifier of the first data stream comprised in the first identification record is the same as the identifier of the second data stream comprised in the second identification record, querying, by the data processing device, whether a first association entry exists or does not exist in the correspondence table, wherein the first association entry stores the identifier of the application comprised in the first identification record and the identifier of the process comprised in the second identification record; and
   in response to the querying indicating that the first association entry does not exist in the correspondence table, determining, by the data processing device, that the first identification record is an incorrect identification record.

2. The method according to claim 1, wherein in response to the querying indicating that the first association entry does not exist, the method further comprising:
   sending, by the data processing device and to the terminal device, the identifier of the process comprised in the second identification record, wherein the terminal device is configured to set a packet collection flag for the identifier of the process, and wherein the packet collection flag instructs the terminal device to obtain and store, after capturing by using an interface of an operating system a packet transmitted by the process, a complete data stream subsequently transmitted by the process.

3. The method according to claim 2, wherein in response to the querying indicating that the first association entry does not exist, the method further comprising:
   querying, by the data processing device, whether a second association entry exists or does not exist in the correspondence table, wherein the second association entry stores an identifier of a process comprised in the second identification record and an identifier of a corresponding application;
   in response to the querying indicating that the second association entry exists in the correspondence table, generating, by the data processing device, a first association identification rule and a second association identification rule, wherein the first association identification rule comprises the identifier of the application in the second association entry and a 3-tuple comprising the destination address, the destination port, and the protocol identifier of the first data stream, and wherein the second association identification rule comprises the identifier of the application in the second association entry and a 3-tuple comprising the source address, the source port, and the protocol identifier of the first data stream; and sending, by the data processing device, the first association identification rule and the second association identification rule to the network security device.

4. The method according to claim 2, further comprising:

receiving, by the data processing device, a third identification record from the network security device, wherein the third identification record comprises an identifier of a third data stream and an unidentified flag, and wherein the unidentified flag indicates that the network security device has not identified an application sending the third data stream;

receiving, by the data processing device, a fourth identification record from the terminal device, wherein the fourth identification record comprises an identifier of a fourth data stream and an identifier of a process;

determining, by the data processing device, whether the identifier of the third data stream comprised in the third identification record is the same as the identifier of the fourth data stream comprised in the fourth identification record;

in response to determining that the identifier of the third data stream comprised in the third identification record is the same as the identifier of the fourth data stream comprised in the fourth identification record, querying, by the data processing device, whether a third association entry exists or does not exist in the correspondence table, wherein the third association entry stores the identifier of the process comprised in the fourth identification record;

in response to the querying indicating that the third association entry exists in the correspondence table, generating, by the data processing device, a fifth association identification rule and a sixth association identification rule, wherein the fifth association identification rule comprises an identifier of an application comprised in the third association entry and a 3-tuple comprising a destination address, a destination port, and a protocol identifier of the third data stream, and wherein the sixth association identification rule comprises the identifier of the application comprised in the third association entry and a 3-tuple comprising a source address, a source port, and the protocol identifier of the third data stream; and sending, by the data processing device, the fifth association identification rule and the sixth association identification rule to the network security device.

5. The method according to claim 2, further comprising:

receiving, by the data processing device, a third identification record from the network security device, wherein the third identification record comprises an identifier of a third data stream and an unidentified flag, and wherein the unidentified flag is used to indicate that the network security device has not identified an application sending the third data stream;

receiving, by the data processing device, a fourth identification record from the terminal device, wherein the fourth identification record comprises an identifier of a fourth data stream and an identifier of a process;

determining, by the data processing device, whether the identifier of the third data stream comprised in the third identification record is the same as the identifier of the fourth data stream comprised in the fourth identification record;

in response to determining that the identifier of the third data stream comprised in the third identification record is the same as the identifier of the fourth data stream comprised in the fourth identification record, querying, by the data processing device, whether a third association entry exists or does not exist in the correspondence table, wherein the third association entry stores the identifier of the process comprised in the fourth identification record; and in response to the querying indicating that the third association entry exists in the correspondence table, sending, by the data processing device, an identifier of an application comprised in the third association entry and the identifier of the third data stream to the network security device.

6. The method according to claim 1, wherein the first identification record further comprises an identifier of an identification manner, wherein the identification manner comprises association identification manner, feature identification manner, and heuristic identification manner; and wherein in response to determining that the identifier of the identification manner in the first identification record is an identifier of an association identification manner, when the first association entry does not exist, the method further comprising:

sending, by the data processing device, a notification message to the network security device, wherein the notification message instructs the network security device to delete a first association identification rule or a second association identification rule, wherein the first association identification rule comprises a 3-tuple comprising the destination address, the destination port, and the protocol identifier of the first data stream, and wherein the second association identification rule comprises a 3-tuple comprising the source address, the source port, and the protocol identifier of the first data stream.

7. The method according to claim 1, wherein in response to the querying indicating that the first association entry does not exist, the method further comprising:

querying, by the data processing device, whether a second association entry exists or does not exist in the correspondence table, wherein the second association entry stores an identifier of a process comprised in the second identification record and an identifier of a corresponding application;

in response to the querying indicating that the second association entry exists in the correspondence table, generating, by the data processing device, a first association identification rule and a second association identification rule, wherein the first association identification rule comprises the identifier of the application in the second association entry and a 3-tuple comprising the destination address, the destination port, and the protocol identifier of the first data stream, and wherein the second association identification rule comprises the identifier of the application in the second association entry and a 3-tuple comprising the source address, the source port, and the protocol identifier of the first data stream; and sending, by the data processing device, the first association identification rule and the second association identification rule to the network security device.

8. The method according to claim 1, further comprising:
receiving, by the data processing device, a third identification record from the network security device, wherein the third identification record comprises an identifier of a third data stream and an unidentified flag, and wherein the unidentified flag indicates that the network security device has not identified an application sending the third data stream;
receiving, by the data processing device, a fourth identification record from the terminal device, wherein the fourth identification record comprises an identifier of a fourth data stream and an identifier of a process;
determining, by the data processing device, whether the identifier of the third data stream comprised in the third identification record is the same as the identifier of the fourth data stream comprised in the fourth identification record;
in response to determining that the identifier of the third data stream comprised in the third identification record is the same as the identifier of the fourth data stream comprised in the fourth identification record, querying, by the data processing device, whether a third association entry exists or does not exist in the correspondence table, wherein the third association entry stores the identifier of the process comprised in the fourth identification record;
in response to the querying indicating that the third association entry exists in the correspondence table, generating, by the data processing device, a fifth association identification rule and a sixth association identification rule, wherein the fifth association identification rule comprises an identifier of an application comprised in the third association entry and a 3-tuple comprising a destination address, a destination port, and a protocol identifier of the third data stream, and wherein the sixth association identification rule comprises the identifier of the application comprised in the third association entry and a 3-tuple comprising a source address, a source port, and the protocol identifier of the third data stream; and
sending, by the data processing device, the fifth association identification rule and the sixth association identification rule to the network security device.

9. The method according to claim 1, further comprising:
receiving, by the data processing device, a third identification record from the network security device, wherein the third identification record comprises an identifier of a third data stream and an unidentified flag, and wherein the unidentified flag is used to indicate that the network security device has not identified an application sending the third data stream;
receiving, by the data processing device, a fourth identification record from the terminal device, wherein the fourth identification record comprises an identifier of a fourth data stream and an identifier of a process;
determining, by the data processing device, whether the identifier of the third data stream comprised in the third identification record is the same as the identifier of the fourth data stream comprised in the fourth identification record;
in response to determining that the identifier of the third data stream comprised in the third identification record is the same as the identifier of the fourth data stream comprised in the fourth identification record, querying, by the data processing device, whether a third association entry exists or does not exist in the correspondence table, wherein the third association entry stores the identifier of the process comprised in the fourth identification record; and
in response to the querying indicating that the third association entry exists in the correspondence table, sending, by the data processing device, an identifier of an application comprised in the third association entry and the identifier of the third data stream to the network security device.

10. A data processing device, wherein the data processing device comprises a memory, at least one processor, and a network interface, and the memory, the at least one processor, and the network interface communicate with each other by using a bus;
wherein the memory stores program code;
wherein the network interface is configured to:
receive a first identification record from a network security device, wherein the first identification record comprises an identifier of a first data stream and an identifier of an application, and wherein the identifier of the first data stream is a 5-tuple comprising a source address, a source port, a destination address, a destination port, and a protocol identifier; and
receive a second identification record and a correspondence table from a terminal device, wherein the second identification record comprises an identifier of a second data stream and an identifier of a process, and wherein each entry in the correspondence table stores an identifier of an application and an identifier of a process created by the application; and
wherein the program code stored in the memory, when executed by the at least one processor, causes the at least one processor to perform operations comprising:
determining whether the identifier of the first data stream comprised in the first identification record is the same as the identifier of the second data stream comprised in the second identification record;
in response to determining that the identifier of the first data stream comprised in the first identification record is the same as the identifier of the second data stream comprised in the second identification record, querying whether a first association entry exists or does not exist in the correspondence table, wherein the first association entry stores the identifier of the application comprised in the first identification record and an identifier of a process comprised in the second identification record; and
in response to the querying indicating that the first association entry does not exist in the correspondence table, determining that the first identification record is an incorrect identification record.

11. The data processing device according to claim 10, wherein the network interface is further configured to:
send, to the terminal device, the identifier of the process comprised in the second identification record, wherein the terminal device is configured to set a packet collection flag for the identifier of the process, and wherein the packet collection flag instructs the terminal device to obtain and store, after capturing by using an interface of an operating system a packet transmitted by the process, a complete data stream subsequently transmitted by the process.

12. The data processing device according to claim 11, wherein in response to the querying indicating that the first association entry does not exist:

the program code stored in the memory, when executed by the at least one processor, causes the at least one processor to:
query whether a second association entry exists or does not exist in the correspondence table, wherein the second association entry stores an identifier of a process comprised in the second identification record, and an identifier of a corresponding application;
in response to the querying indicating that the second association entry exists in the correspondence table, generate a first association identification rule and a second association identification rule, wherein the first association identification rule comprises the identifier of the application in the second association entry and a 3-tuple comprising the destination address, the destination port, and the protocol identifier of the first data stream, and wherein the second association identification rule comprises the identifier of the application in the second association entry and a 3-tuple comprising the source address, the source port, and the protocol identifier of the first data stream; and
the network interface is further configured to:
send the first association identification rule and the second association identification rule to the network security device.

13. The data processing device according to claim 11, wherein:
the network interface is further configured to:
receive a third identification record from the network security device, wherein the third identification record comprises an identifier of a third data stream and an unidentified flag, and wherein the unidentified flag indicates that the network security device has not identified an application sending the third data stream; and
receive a fourth identification record from the terminal device, wherein the fourth identification record comprises an identifier of a fourth data stream and an identifier of a process;
the program code stored in the memory, when executed by the at least one processor, causes the at least one processor to:
determine whether the identifier of the third data stream comprised in the third identification record is the same as the identifier of the fourth data stream comprised in the fourth identification record;
in response to determining that the identifier of the third data stream included in the third identification record is the same as the identifier of the fourth data stream included in the fourth identification record, query whether a third association entry exists or does not exist in the correspondence table, wherein the third association entry stores the identifier of the process comprised in the fourth identification record; and
in response to the querying indicating that the third association entry exists in the correspondence table, generate a fifth association identification rule and a sixth association identification rule, wherein the fifth association identification rule comprises an identifier of an application comprised in the third association entry and a 3-tuple comprising a destination address, a destination port, and a protocol identifier of the third data stream, and wherein the sixth association identification rule comprises the identifier of the application comprised in the third association entry and a 3-tuple comprising a source address, a source port, and the protocol identifier of the third data stream; and
the network interface is further configured to send the fifth association identification rule and the sixth association identification rule to the network security device.

14. The data processing device according to claim 11, wherein:
the network interface is further configured to:
receive a third identification record from the network security device, wherein the third identification record comprises an identifier of a third data stream and an unidentified flag, and wherein the unidentified flag is used to indicate that the network security device has not identified an application sending the third data stream; and
receive a fourth identification record from the terminal device, wherein the fourth identification record comprises an identifier of a fourth data stream and an identifier of a process;
the program code stored in the memory, when executed by the at least one processor, causes the at least one processor to:
determine whether the identifier of the third data stream comprised in the third identification record is the same as the identifier of the fourth data stream comprised in the fourth identification record; and
in response to determining that the identifier of the third data stream comprised in the third identification record is the same as the identifier of the fourth data stream comprised in the fourth identification record, query whether a third association entry exists or does not exist in the correspondence table, wherein the third association entry stores the identifier of the process comprised in the fourth identification record; and
the network interface is further configured to:
in response to the querying indicating that the third association entry exists in the correspondence table, send an identifier of an application comprised in the third association entry and the identifier of the third data stream to the network security device.

15. The data processing device according to claim 10, wherein:
the first identification record further comprises an identifier of an identification manner, wherein the identification manner comprises association identification manner, feature identification manner, and heuristic identification manner; and
the network interface is further configured to:
in response to determining that the identifier of the identification manner in the first identification record is an identifier of an association identification manner, when the first association entry does not exist, send a notification message to the network security device, wherein the notification message instructs the network security device to delete a first association identification rule or a second association identification rule, wherein the first association identification rule comprises a 3-tuple comprising the destination address, the destination port, and the protocol identifier of the first data stream, and wherein the second association identification rule comprises a 3-tuple comprising the source address, the source port, and the protocol identifier of the first data stream.

16. The data processing device according to claim 10, wherein in response to the querying indicating that the first association entry does not exist:
the program code stored in the memory, when executed by the at least one processor, causes the at least one processor to:
query whether a second association entry exists or does not exist in the correspondence table, wherein the second association entry stores an identifier of a process comprised in the second identification record, and an identifier of a corresponding application;
in response to the querying indicating that the second association entry exists in the correspondence table, generate a first association identification rule and a second association identification rule, wherein the first association identification rule comprises the identifier of the application in the second association entry and a 3-tuple comprising the destination address, the destination port, and the protocol identifier of the first data stream, and wherein the second association identification rule comprises the identifier of the application in the second association entry and a 3-tuple comprising the source address, the source port, and the protocol identifier of the first data stream; and
the network interface is further configured to:
send the first association identification rule and the second association identification rule to the network security device.

17. The data processing device according to claim 10, wherein:
the network interface is further configured to:
receive a third identification record from the network security device, wherein the third identification record comprises an identifier of a third data stream and an unidentified flag, and wherein the unidentified flag indicates that the network security device has not identified an application sending the third data stream; and
receive a fourth identification record from the terminal device, wherein the fourth identification record comprises an identifier of a fourth data stream and an identifier of a process;
the program code stored in the memory, when executed by the at least one processor, causes the at least one processor to:
determine whether the identifier of the third data stream comprised in the third identification record is the same as the identifier of the fourth data stream comprised in the fourth identification record; and
in response to determining that the identifier of the third data stream included in the third identification record is the same as the identifier of the fourth data stream included in the fourth identification record, query whether a third association entry exists or does not exist in the correspondence table, wherein the third association entry stores the identifier of the process comprised in the fourth identification record; and
in response to the querying indicating that the third association entry exists in the correspondence table, generate a fifth association identification rule and a sixth association identification rule, wherein the fifth association identification rule comprises an identifier of an application comprised in the third association entry and a 3-tuple comprising a destination address, a destination port, and a protocol identifier of the third data stream, and wherein the sixth association identification rule comprises the identifier of the application comprised in the third association entry and a 3-tuple comprising a source address, a source port, and the protocol identifier of the third data stream; and
the network interface is further configured to send the fifth association identification rule and the sixth association identification rule to the network security device.

18. The data processing device according to claim 10, wherein:
the network interface is further configured to:
receive a third identification record from the network security device, wherein the third identification record comprises an identifier of a third data stream and an unidentified flag, and wherein the unidentified flag is used to indicate that the network security device has not identified an application sending the third data stream; and
receive a fourth identification record from the terminal device, wherein the fourth identification record comprises an identifier of a fourth data stream and an identifier of a process;
the program code stored in the memory, when executed by the at least one processor, causes the at least one processor to:
determine whether the identifier of the third data stream comprised in the third identification record is the same as the identifier of the fourth data stream comprised in the fourth identification record; and
in response to determining that the identifier of the third data stream comprised in the third identification record is the same as the identifier of the fourth data stream comprised in the fourth identification record, query whether a third association entry exists or does not exist in the correspondence table, wherein the third association entry stores the identifier of the process comprised in the fourth identification record; and
the network interface is further configured to:
in response to the querying indicating that the third association entry exists in the correspondence table, send an identifier of an application comprised in the third association entry and the identifier of the third data stream to the network security device.

19. A system for identifying application information in network traffic, comprising a data processing device, a terminal device, and a network security device, wherein:
the network security device is configured to:
receive a first data stream;
generate a first identification record after determining an identifier of an application sending the first data stream, wherein the first identification record comprises an identifier of the first data stream and the identifier of the application, and the identifier of the first data stream is a 5-tuple comprising a source address, a source port, a destination address, a destination port, and a protocol identifier; and
send the first identification record to the data processing device;
the terminal device is configured to:
obtain an identifier of a process running on the terminal device and an identifier of a second data stream created by the process to generate a second identification record, wherein the second identification record comprises the identifier of the second data stream and the identifier of the process;

obtain a correspondence table, wherein each entry in the correspondence table stores an identifier of an application and an identifier of a process created by the application; and send the second identification record and the correspondence table to the data processing device; and the data processing device is configured to:

receive the first identification record from the network security device;

receive the second identification record and the correspondence table from the terminal device;

determine whether the identifier of the first data stream comprised in the first identification record is the same as the identifier of the second data stream comprised in the second identification record;

in response to determining that the identifier of the first data stream comprised in the first identification record is the same as the identifier of the second data stream comprised in the second identification record, query whether a first association entry exists or does not exist in the correspondence table, wherein the first association entry stores the identifier of the application comprised in the first identification record and the identifier of the process comprised in the second identification record; and in response to the querying indicating that the first association entry does not exist in the correspondence table, determine that the first identification record is an incorrect identification record.

20. The system according to claim 19, wherein in response to the querying indicating that the first association entry does not exist, the data processing device is further configured to:

send, to the terminal device, the identifier of the process comprised in the second identification record, wherein the terminal device is configured to set a packet collection flag for the identifier of the process, and wherein the packet collection flag instructs the terminal device to obtain and store, after capturing by using an interface of an operating system a packet transmitted by the process, a complete data stream subsequently transmitted by the process.

* * * * *